(12) United States Patent
Stühlmeyer

(10) Patent No.: US 9,292,355 B2
(45) Date of Patent: Mar. 22, 2016

(54) BROKER SYSTEM FOR A PLURALITY OF BROKERS, CLIENTS AND SERVERS IN A HETEROGENEOUS NETWORK

(75) Inventor: Wolfgang Stühlmeyer, Gau-Odernheim (DE)

(73) Assignee: SOFTWARE AG, Darmstadt (DE)

( * ) Notice: Subject to any disclaimer, the term of this patent is extended or adjusted under 35 U.S.C. 154(b) by 1229 days.

(21) Appl. No.: 12/458,734

(22) Filed: Jul. 21, 2009

(65) Prior Publication Data
US 2010/0325252 A1  Dec. 23, 2010

(30) Foreign Application Priority Data
Jun. 18, 2009 (EP) .................................... 09163108

(51) Int. Cl.
| | |
|---|---|
| G06F 15/173 | (2006.01) |
| G06F 9/50 | (2006.01) |
| H04L 12/24 | (2006.01) |
| H04L 29/06 | (2006.01) |
| H04L 29/08 | (2006.01) |
| G06F 11/20 | (2006.01) |

(52) U.S. Cl.
CPC .......... *G06F 9/5083* (2013.01); *H04L 41/0803* (2013.01); *H04L 63/102* (2013.01); *H04L 67/2809* (2013.01); *G06F 11/2038* (2013.01); *G06F 11/2097* (2013.01); *G06F 2221/2103* (2013.01)

(58) Field of Classification Search
USPC ........................................................ 709/222
See application file for complete search history.

(56) References Cited

U.S. PATENT DOCUMENTS

| | | | |
|---|---|---|---|
| 7,383,355 B1* | 6/2008 | Berkman et al. | 709/246 |
| 8,191,078 B1* | 5/2012 | Cullen et al. | 719/315 |
| 2002/0052876 A1* | 5/2002 | Waters | 707/100 |
| 2004/0002960 A1* | 1/2004 | Drake et al. | 707/3 |
| 2004/0111509 A1* | 6/2004 | Eilam et al. | 709/224 |
| 2005/0108133 A1* | 5/2005 | Balasubramanian et al. | 705/35 |
| 2006/0034237 A1* | 2/2006 | Patrick et al. | 370/338 |
| 2006/0136555 A1* | 6/2006 | Patrick et al. | 709/203 |
| 2006/0212556 A1* | 9/2006 | Yacoby et al. | 709/223 |
| 2008/0155649 A1* | 6/2008 | Maler et al. | 726/1 |
| 2008/0235357 A1* | 9/2008 | Gustafsson | 709/220 |
| 2008/0301053 A1* | 12/2008 | Tserkovny et al. | 705/54 |
| 2008/0301760 A1* | 12/2008 | Lim | 726/1 |
| 2009/0063667 A1* | 3/2009 | Smith et al. | 709/222 |
| 2010/0057833 A1* | 3/2010 | DeHaan | 709/203 |
| 2011/0119730 A1* | 5/2011 | Eldar et al. | 726/1 |

OTHER PUBLICATIONS

Object Management Group: The Common Object Request Broker: Architecture and Specification, Jul. 1995 pp. 1-55.
"Sun Java System Message Queue 4.1 Technical Overview," Sun Documentation, Sep. 2007, pp. 1-117.

* cited by examiner

*Primary Examiner* — Natisha Cox
(74) *Attorney, Agent, or Firm* — Nixon & Vanderhye P.C.

(57) ABSTRACT

The present invention concerns a broker system for a plurality of brokers (20), clients (10) and servers (30) in a heterogeneous network, the broker system comprising:
a. a configuration and controlling broker (CCB) (1) adapted for scanning broker configuration data (200) of the plurality of brokers (20) and for synchronizing the broker configuration data (200) with CCB configuration data (100) of the CCB (1).

17 Claims, 12 Drawing Sheets

Fig. 9

Figure 1:
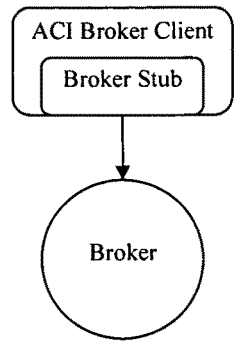

```
/* General callback information */
/* Key - reserved for future use, must be empty */
struct 'AR_GENERAL' is
   define data parameter
      1 SessionID          (A32)
      1 UserId             (A32)
      1 UserPassword       (A64)
      1 ErrorClass         (I4)
      1 ErrorCode          (I4)
      1 ErrorMessage       (A256)
      1 Option             (I4)
      1 Key                (A256)
   end-define
```

Fig. 10

```
/*
*************************************************************************
* File Version  : $Revision: 1.8 $
* File          : SagCfgAuthRulesV1.idl
* Description   : IDL for Config Service SAG/ETBCIS/RPCCIS
*
*/
library 'SAGARV1':'SagCfgAuthRulesV1' is

.
                              .
                              .

** End of file
```

Fig. 11

```
/*
*************************************************************************
* File Version   : $Revision: 1.15 $
* File           : SagCfgLocTransV1.idl
* Description    : IDL for Config Service SAG/ETBCIS/RPCCIS
*
*/
library 'SAGLTV1':'SagCfgLocTransV1' is

.
                            .
                            .  .

** End of file
```

Fig. 12

```
/*
 * Creates a new Service. The caller has to fill the following fields
 * of "InfService": ServiceName, HostName, TcpPort, SslPort, Transport.
 */
program 'CRSERVICE':'createService' is
    define data parameter
        1 CbGeneral         ('CB_GENERAL')          In Out
        1 InfService        ('INFO_GEN_SERVICE')    In
        1 Function_Result   (I4)                    Out
    end-define /*
***********************************************************************
* File Version  : $Revision: 1.28 $
* File          : SagCisAdminV1.idl
* Description   : IDL for Command Service SAG/ETBCIS/RPCCIS
*
*/
library 'SAGADV1':'SagCisAdminV1' is /* BrokerName  == Broker name including blanks and none us ascii characters */
/* BrokerId    == BrokerId from attribute file */
/*                (created from the BrokerName without blanks and none us */
/*                ascii characters) */
/* BrokerUrl == 'hostname:port:protocol?sslparameters' || */
/* BrokerUrl == 'protocol://hostname:port?sslparameters' */

.
                    .
                    .

** End of file
```

Fig. 13

```
/*
*********************************************************************
* File Version   : $Revision: 1.14 $
* File           : SagCfgCisMgmtV1.idl
* Description    : IDL for Config Service SAG/ETBCIS/RPCCIS
*
*/
library 'SAGCMV1':'SagCfgCisMgmtV1' is

.
                        .
                        .

** End of file
```

BROKER SYSTEM FOR A PLURALITY OF BROKERS, CLIENTS AND SERVERS IN A HETEROGENEOUS NETWORK

This application claims priority to European Patent Application No. 09163108.5 filed 18 Jun. 2009, the entire contents of which is hereby incorporated by reference.

This application incorporates by reference computer program listings found in the computer program listing appendix deposited as part of the file for this application. The computer program listing appendix includes the following files that are referenced in the specification "Code Portion For FIG. 10.txt" (Created: Sep. 1, 2015; Size: 6,947 Bytes), "Code Portion For FIG. 11.txt" (Created: Sep. 1, 2015; Size: 10,439 Bytes), "Code Portion For FIG. 12.txt" (Created: Sep. 1, 2015; Size: 18,241 Bytes), and "Code Portion For FIG. 13.txt" (Created: Sep. 1, 2015; Size: 22,651 Bytes.

1. TECHNICAL FIELD

The present invention relates to a broker system for a plurality of brokers, clients and servers in a heterogeneous network and a corresponding method.

2. THE PRIOR ART

Modern computing environments typically comprise a plurality of distinct computers connected within a network, wherein the participating computers can be broadly classified into client and server computers. A server in this context is a computer that provides certain functionality to another computer, called a client. A server may e.g. provide data to the client as a result of the processing of a computer program on the server itself and/or may itself request functionality of a further server (in so-called multi-tier architectures). Functionality provided by a server is typically called a service offered to the client.

In order for clients to find a server suitable for processing the client's request, it is known to provide so-called brokers. A broker is an intermediary computer that moderates between clients and servers, i.e. a broker receives requests by a client, passes it to a suitable server and returns a response from the server back to the client. Such broker architectures have the advantage that a client does not have to possess knowledge of each individual server, but is only required to know the broker.

Modern networks typically not only comprise one broker, but a plurality of brokers each managing a part of the network. Furthermore, a plurality of distinct networks may be combined in order to provide clients in one network access to servers of another network. An example of such a combined network with millions of communicating computer systems is the Internet. It is apparent that the availability of the brokers within such a complex network is crucial and that any malfunction or unavailability of a broker may lead to a complete breakdown of the communication within the network.

However, such complex computer networks have two major disadvantages. Firstly, they are typically heterogeneous, i.e. the various computers such as clients, servers and brokers may run on different hardware platforms, different operating systems and may employ different and possibly incompatible communication protocols. Therefore, each broker within such a network may employ its own configuration settings in a format specific to its specific hardware, operating system and communication protocol. The maintenance of each individual broker in such a complex and heterogeneous network is highly inefficient and error-prone. In fact, maintaining a complex network with possibly thousands of brokers individually is almost impossible without introducing errors into the broker configuration that may lead to malfunction and unavailability of the network.

Secondly, security is an important issue in complex networks, since it must be ensured that a client cannot gain access to data from a server without proper authorization. In the prior art, each broker may to this end maintain its own authorization concept, which is most likely incompatible with the other participants due to the heterogeneity of the network. Maintaining such scattered and possibly incompatible authorization concepts is also highly inefficient and error-prone, and most importantly, may lead to severe security holes within the overall network.

In the field of heterogeneous computing environments, the U.S. Pat. No. 5,329,419 and the U.S. Pat. No. 5,812,768 of Applicant disclose a communication broker that manages service offerings from servers and service requests from clients, in that clients and servers communicate and exchange information with one another via the broker. Furthermore, several individual brokers may be active simultaneously within a network. However, especially in the context of heterogeneous networks comprising a great number of brokers, the configuration and administration of the individual brokers is ineffective and error-prone, as already discussed above.

The U.S. Pat. No. 5,619,710 discloses an apparatus for object-oriented invocation of a server application by a client application. To this end, a database manages classes of data instances. Client applications can remotely invoke other applications by sending messages referencing certain methods to be invoked. The database then locates and executes the actual code to implement the referenced methods. The U.S. Pat. No. 6,115,774 discloses a gateway executor program running on a server that facilitates the communication of client requests to target service programs of the server as well as an application programming interface. Lastly, the US 2002/0019872 and the WO 02/10917 disclose a system for load-balancing of client requests among servers in an Internet Inter-ORB Protocol (IIOP) environment. However, none of the above-cited references help in maintaining a complex network comprising more than one broker in such a manner as to address the above-presented challenges.

It is therefore the technical problem underlying the present invention to provide a method and system for configuring and controlling a complex heterogeneous computer network, so that it is effectively maintainable and secure, thereby at least partly overcoming the above explained disadvantages of the prior art.

3. SUMMARY OF THE INVENTION

This problem is according to one aspect of the invention solved by a broker system for a plurality of brokers, clients and servers in a heterogeneous network. In the embodiment of claim 1, the broker system comprises:

a. a configuration and controlling broker (CCB) adapted for scanning broker configuration data of the plurality of brokers and for synchronizing the broker configuration data with CCB configuration data of the CCB.

Accordingly, the embodiment defines a configuration and controlling broker (CCB) within a broker system that is capable for effectively maintaining, configuring and controlling a plurality of brokers, clients and servers within a heterogeneous network. Each of the plurality of brokers within the network comprises broker configuration data that defines, among others, how the respective broker connects clients and servers and/or which communication protocols to use. In one aspect, the broker configuration data of the plurality of brokers may to this end comprise a configuration file, one or more SSL (Secure Sockets Layer) certificates and/or one or more log files of the respective broker.

The CCB comprises CCB configuration data that defines configuration settings of the CCB determining the processing of the CCB. The CCB configuration data is preferably loaded by the CCB during start-up of the CCB. Furthermore, the CCB is capable of scanning the broker configuration data of the brokers and for synchronizing the broker configuration data with the CCB configuration data. To this end, the broker system of the present invention may in one aspect comprise a storage medium, such as an EntireX directory, the storage medium comprising a configuration directory for each of the plurality of brokers, the respective configuration directory comprising the broker configuration data of the respective broker, wherein the CCB is adapted for scanning the broker configuration directories. In other words, each broker may store its broker configuration data in a central place (the storage medium) within the broker system and the CCB may scan, i.e. look for, new broker configuration data within this storage medium. The CCB may therefore scan the storage medium periodically according to a predefined time interval, according to a predefined schedule and/or in response to a notification sent to the CCB once new broker configuration data is received by the storage medium. The scanning of the broker configuration data has the advantage that the CCB is capable of detecting a new broker as soon as it is inserted into the network, i.e. as soon as the new broker configuration data is stored in the storage medium. Furthermore, while synchronizing the broker configuration data with the CCB configuration data, the CCB may copy new broker configuration data into the CCB configuration data and/or may delete old broker configuration data from the CCB configuration data.

In summary, the CCB holds a complete and recent copy of the various broker configuration data of all brokers within the network. This aspect has the advantage that the individual brokers do not have to be configured individually, e.g. by an administrator logging into the respective broker on the local computer of the broker in order to perform changes to the broker configuration data, as it is known in the prior art. Instead, all broker configuration data is available within the CCB configuration data, so that all brokers participating in the network can be configured from one central place, namely the CCB. A further advantage of this aspect is that, in case the CCB configuration data is lost, e.g. due to a hard drive crash, the CCB may re-scan the broker configuration data in order to reconstruct the CCB configuration data. Similarly, in case the broker configuration data of one of the brokers is lost, the CCB still holds an up-to-date copy of this broker configuration data. Accordingly, the CCB configuration data serves also as a backup of the configuration settings of all brokers within the network, thereby increasing the availability of the brokers to a great extent.

According to a further aspect of the invention, the CCB may be adapted for sending a subset of the CCB configuration data to at least one of the plurality of brokers for configuring the respective broker without affecting its availability. Accordingly, new and/or changed broker configuration data (comprised in the CCB configuration data) may be propagated to the brokers and set active during runtime of the brokers. The present invention thereby facilitates the configuring of the brokers from a central place (the CCB) without affecting the availability of the brokers, and therefore the availability of the connected clients and servers.

In another aspect, the CCB may be further adapted for restricting the communication between the plurality of brokers, clients and/or servers in the heterogeneous network according to authorization rules of the CCB. Accordingly, the CCB maintains one or more authorization rules that restrict the processing and/or communication of the brokers, clients and/or servers. In other words, the authorization rules define which actions are allowed to be performed by the brokers, clients and/or servers within the network. This aspect increases the security of the overall network to a great extent, since the CCB effectively controls all actions performed by the various participants of the network, such as the brokers, clients and servers. A further advantage is that also the authorization rules can be edited and maintained from a central location, namely the CCB, so that all participants of the network adhere to a centrally defined and coherent security concept. The authorization rules of the CCB can preferably be modified during runtime of the CCB. Examples and further aspects of the authorization rules can be found in the detailed description below. Furthermore, the CCB may be adapted for sending a subset of the authorization rules to at least one of the plurality of brokers, the subset of the authorization rules defining allowed connections to be established by the respective broker.

In a further aspect of the invention, at least one of the plurality of brokers may be adapted for registering with the CCB, wherein the CCB is adapted for maintaining a list of all registered brokers. Accordingly, each broker, preferably once it starts, may be required to notify the CCB (e.g. via a broadcast message, as will be further explained in the detailed description below). The CCB may maintain a list of each active, i.e. started, broker within the network. This aspect has the advantage that the CCB has an exact knowledge of the available brokers within the network, so that the brokers can be controlled and/or maintained effectively.

Moreover, at least one of the plurality of clients and/or servers may comprise a client stub and/or a server stub, respectively, wherein the client stub and/or the server stub is adapted for requesting authorization by the CCB before establishing a connection to one of the brokers. Accordingly, in contrast to the prior art, where client stubs and server stubs are only used for facilitating the communication between clients, brokers and servers, the client stubs and/or server stubs of the present invention provide additional functionality, namely requesting authorization by the CCB for communicating with the other participants in the network. Preferably, the client stubs and/or server stubs are capable of avoiding any incoming and/or outgoing communication to/from the respective client and/or server, if the CCB did not authorize the respective client and/or server. This aspect greatly increases the security of the overall network, since clients and/or server have no possibility of communicating without being authorized by the CCB.

In a further aspect, the client stub and/or the server stub may be adapted for receiving a subset of the CCB configuration data and/or a subset of the authorization rules and for storing the subset of the CCB configuration data and/or the subset of the authorization rules locally at the respective client and/or server. The subset of the CCB configuration data and/or the subset of the authorization rules is preferably received by the respective client and/or server once during start-up of the client and/or server and preferably comprises only the configuration data and authorization rules relevant to the respective client and/or server. Furthermore, the received data and may be refreshed periodically, according to a predefined time interval or in any other suitable manner. Accordingly, the client stub and/or server stub does not have to contact the CCB in order to ask for authorization each time it wants to communicate with other participants within the network. Instead, the client stub and/or server stub stores the (relevant) subset of configuration data and/or authorization rules locally, so that the client stub and/or the server stub itself may decide whether the respective client and/or server is allowed to communicate as requested, which saves network bandwidth and thereby increases the overall efficiency of the underlying network.

In yet another aspect of the invention, the subset of the CCB configuration data may comprise the list of available brokers. Accordingly, the clients and/or servers may receive the list of available brokers from the CCB, or alternatively only a filtered list of brokers available to them in order to communicate within the network. It is to be noted that this list is maintained and kept up-to-date by the CCB (see further above), so that the clients and/or servers always have an up-to-date knowledge of which brokers to use.

Moreover, the client stub and/or the server stub may be adapted for establishing a connection to at least one of the plurality of brokers according to the stored configuration data and/or the stored authorization rules, if the CCB is unavailable. This aspect is especially advantageous, since in case the CCB crashes or is unavailable for any other reason, the availability of the clients and/or servers is not affected at all, so that they may proceed their processing independently from the CCB, but still according to the authorization rules dictated by the CCB.

Furthermore, the processing of the CCB, i.e. all or part of its above-presented functionalities may be performed by a service running locally on the CCB. In other words, the capabilities of the CCB are performed by a computer program (the service) locally on the computer of the CCB. In contrast to processing the functionalities provided by the CCB from a remote service (located on another computer than the CCB), this aspect of the invention has the advantage that the processing is much more efficient, since no slow network connection have to be used.

In yet another aspect of the invention, the broker system may further comprise at least one backup CCB adapted for receiving a copy of the CCB configuration data from the CCB. The CCB configuration data may be copied to the at least one backup CCB on a periodic basis, in real time or in any other suitable manner. Accordingly, the overall availability of the participants of the network is further increased, since in case of failure of the CCB, the at least one backup CCB may immediately take over the CCB's tasks, thereby ensuring the high-availability of the network.

In a further aspect of the invention, at least one of the plurality of brokers and/or servers may be adapted for sending workload information to the CCB, wherein the CCB may be adapted for starting one or more further brokers and/or servers depending on the workload of the respective broker and/or server. Furthermore, the CCB may be adapted for generating statistics about the workload of at least one of the plurality of brokers and/or servers, the statistics indicating reoccurring workload peaks and wherein the CCB is further adapted for starting one or more further brokers and/or servers before the next expected workload peak.

According to a further aspect of the invention, the CCB configuration data may be comprised in a local file of the CCB and/or in an LDAP (Lightweight Directory Access Protocol) directory. Furthermore, the CCB may be configured to change the storage location of the CCB configuration data from the local file to the LDAP directory and vice versa during runtime. In a further aspect, the CCB configuration data may be stored within and synchronized between the local file and the LDAP directory at the same time. This aspect has the advantage that if the local file (or the LDAP directory) is lost, e.g. due to a hardware crash, the CCB configuration data is still comprised in the LDAP directory (or the local file), so that the CCB can seamlessly continue to function and stays available to the other participants within the network.

The present invention also concerns a configuration and controlling broker (CCB) for use in any of the above-presented broker systems. Furthermore, a method is provided for configuring and controlling a plurality of brokers, clients and servers in a heterogeneous network using any of the above-presented broker systems, as well as a computer program comprising instructions for implementing the above method.

4. SHORT DESCRIPTION OF THE DRAWINGS

Figure 2:
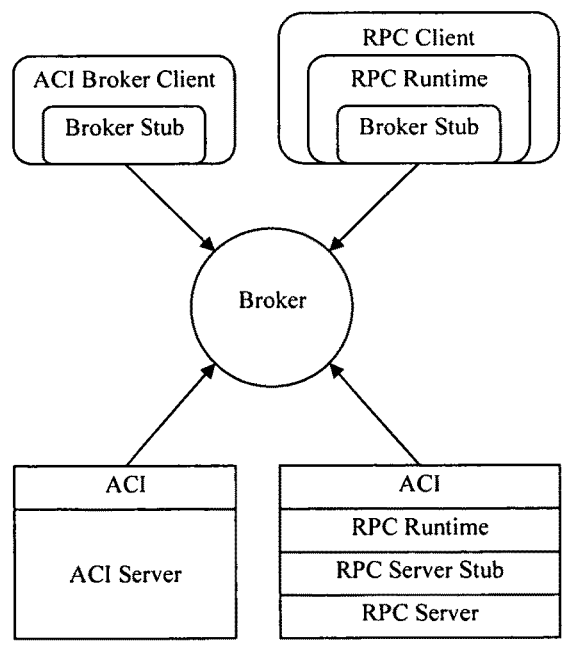
Figure 3:
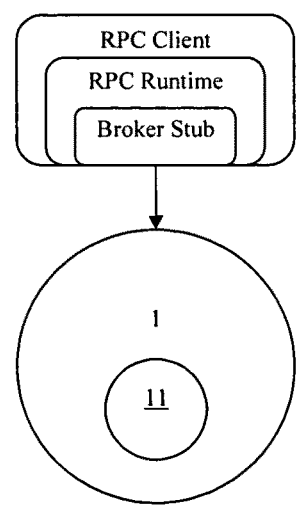
Figure 4:
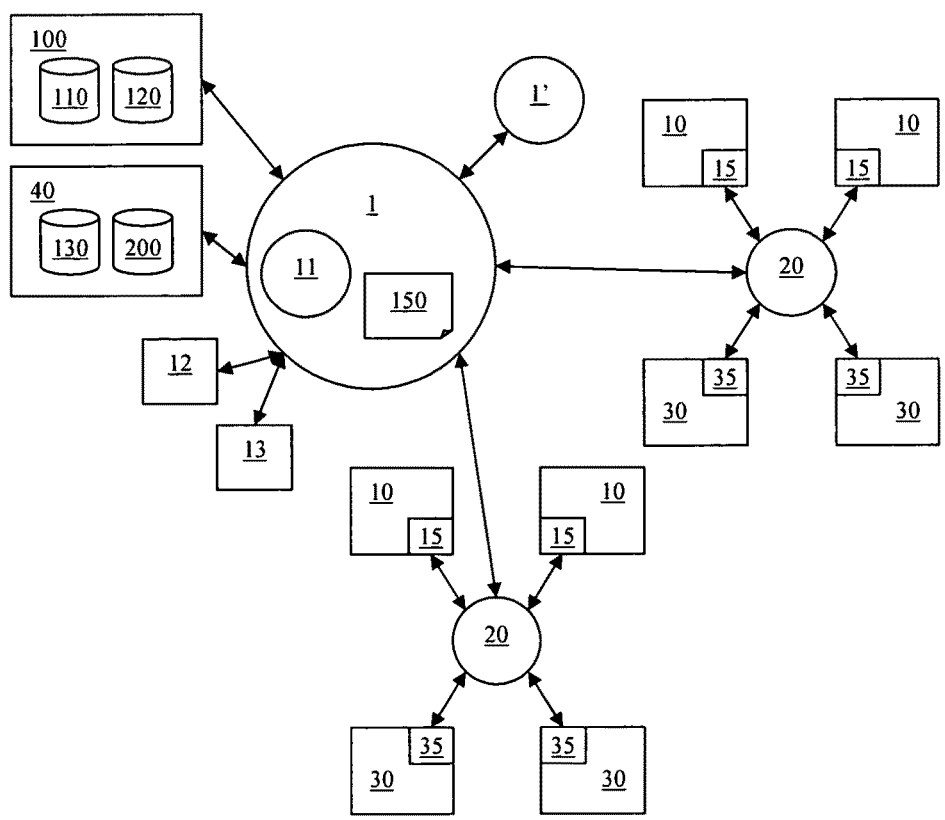
Figure 5:
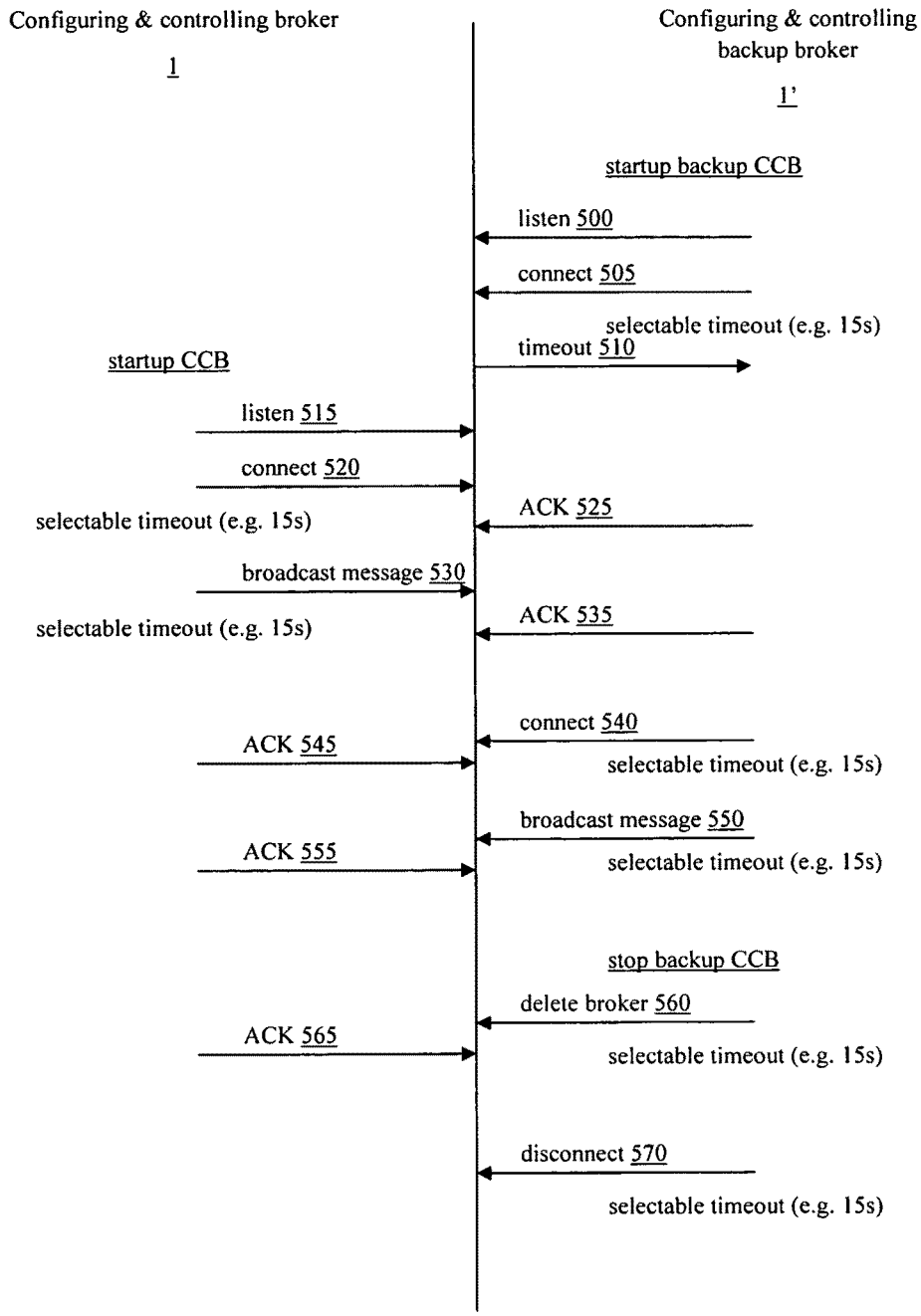
Figure 6:
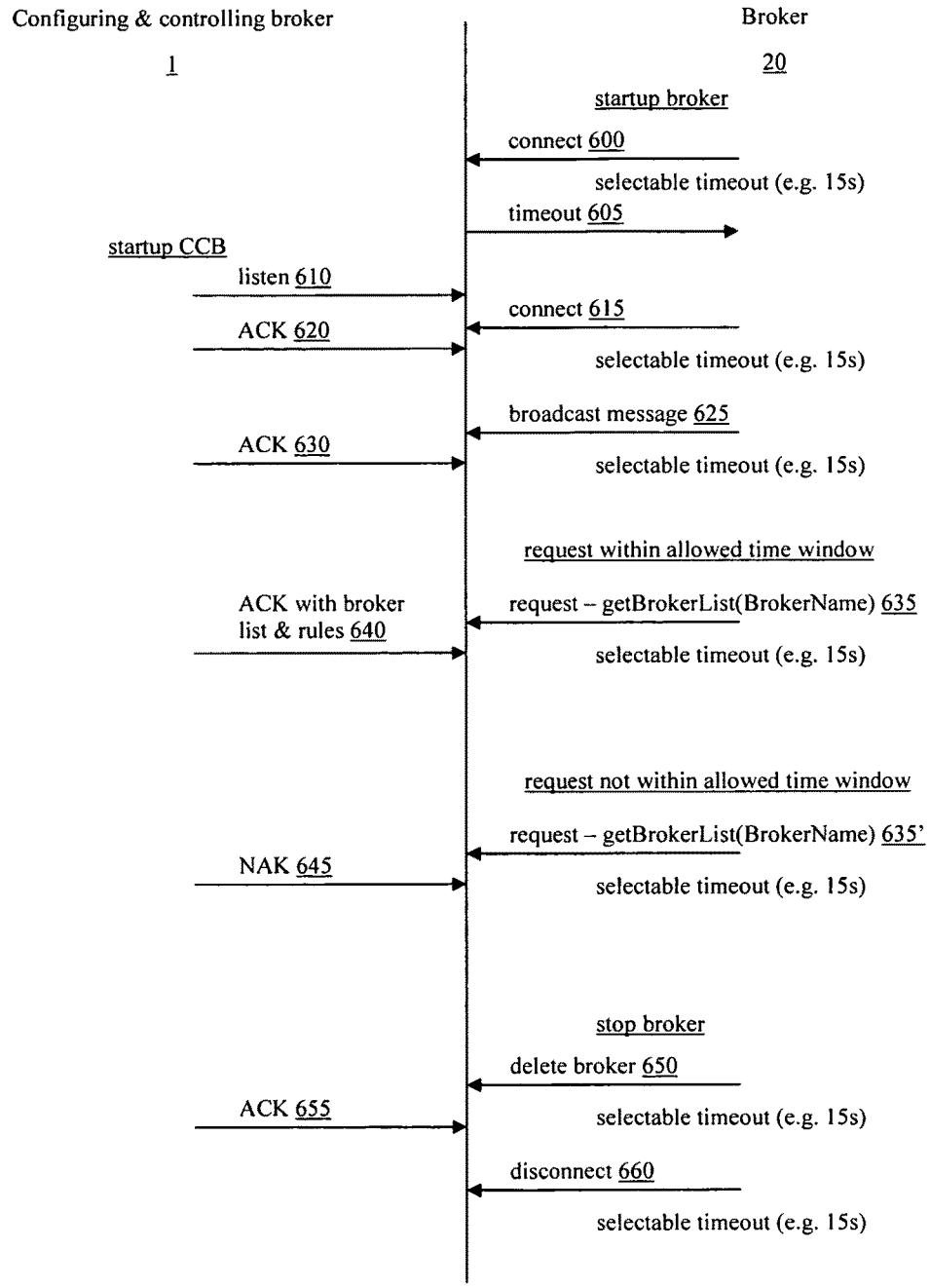
Figure 7:
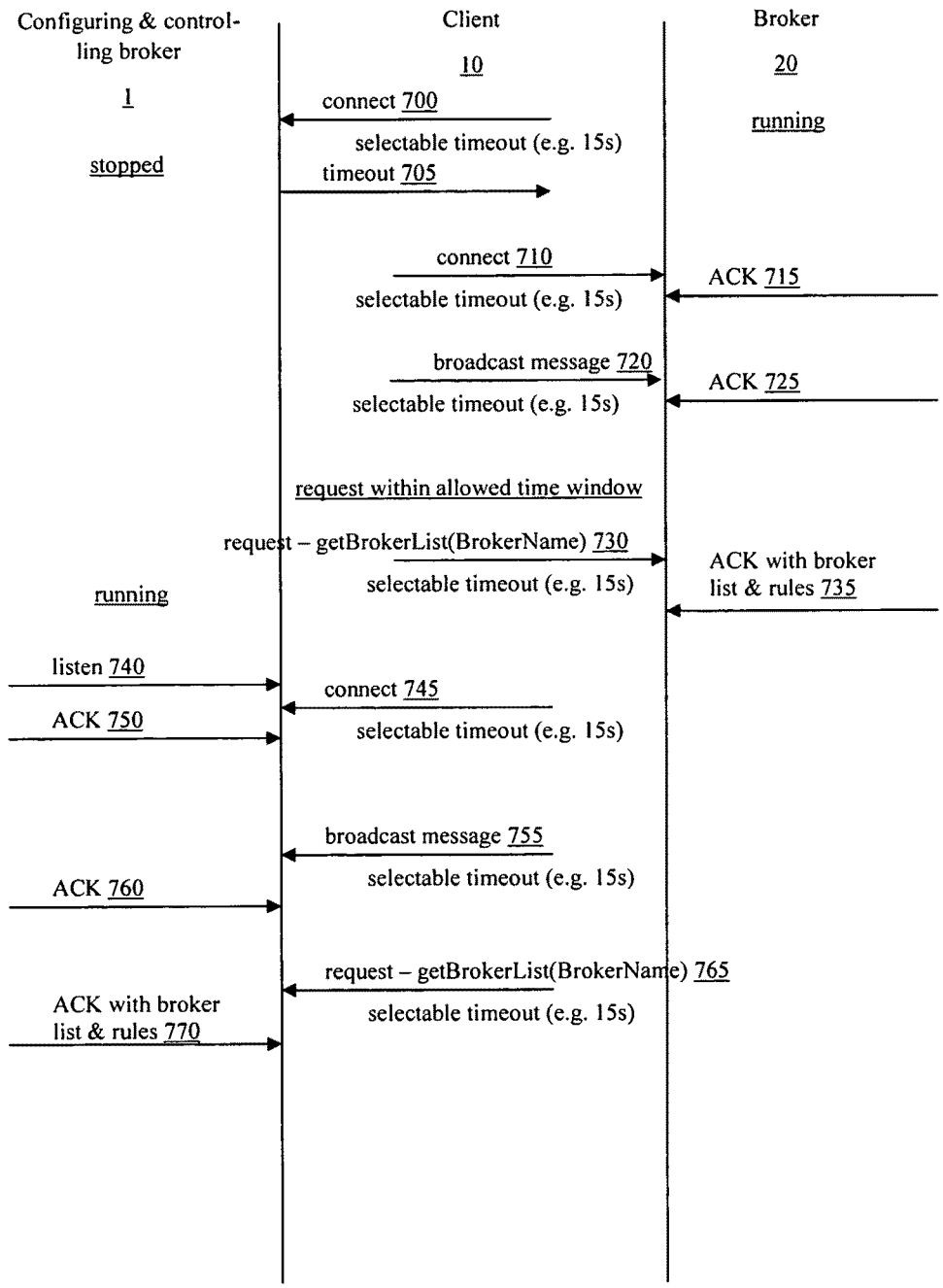
Figure 8:
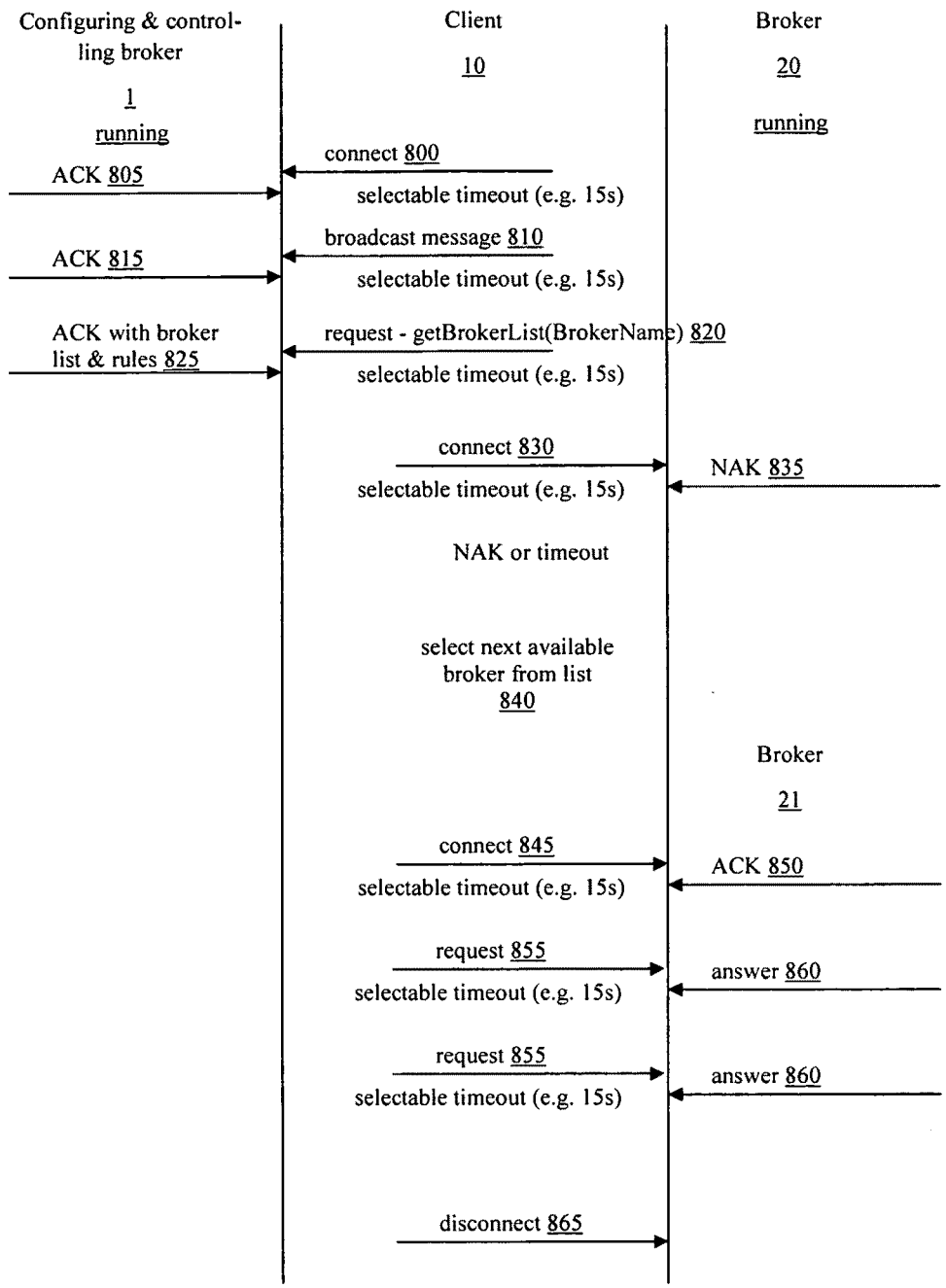
Figure 14:
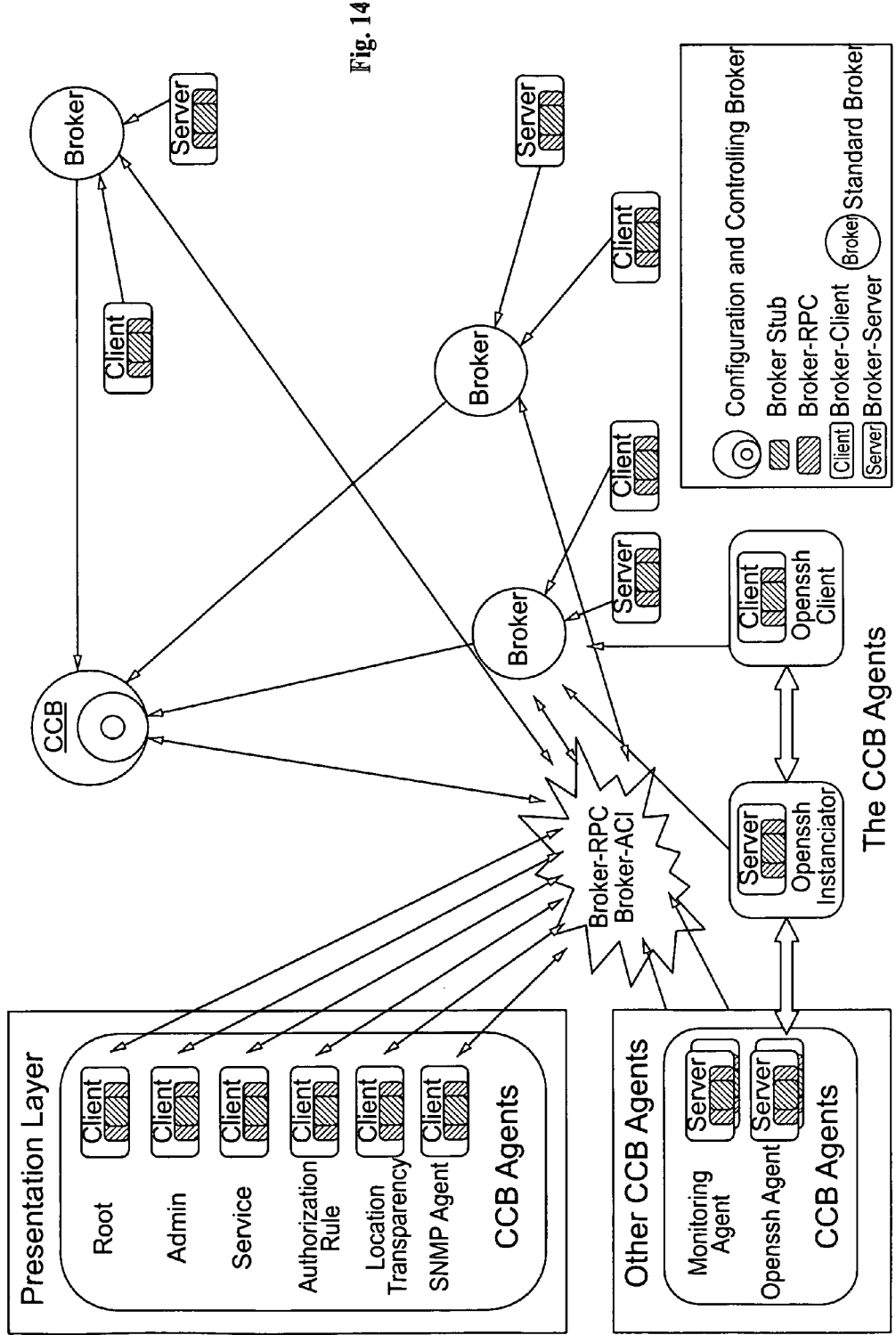

In the following detailed description, presently preferred embodiments of the invention are further described with reference to the following figures:

FIG. 1: A schematic view of a broker client accessing a broker according to the prior art;

FIG. 2: A schematic view of a broker connecting an ACI client and an RPC client with an ACI server and an RPC server according to the prior art;

FIG. 3: A schematic view of an embodiment of a configuring & controlling broker (CCB) according to the present invention;

FIG. 4: A schematic view of an embodiment of a broker system according to the present invention;

FIG. 5: A flow chart of processing steps performed during startup of the CCB and an optional backup CCB according to an embodiment of the present invention;

FIG. 6: A flow chart of processing steps performed when a client establishes a connection to the CCB according to an embodiment of the present invention;

FIG. 7: A flow chart of processing steps performed when a client establishes a connection to a broker while the CCB is unavailable according to an embodiment of the present invention;

FIG. 8: A flow chart of processing steps performed when a client establishes a connection to a broker while the broker is unavailable according to an embodiment of the present invention;

FIG. 9: A listing of an exemplary data structure comprised in an API according to an embodiment of the present invention;

FIG. 10: A listing of an exemplary data structure comprised in an API according to an embodiment of the present invention and shown in the "Code Portion For FIG. 10.txt" file of the incorporated computer program listing appendix;

FIG. 11: A listing of an exemplary authorization rules interface of the CCB according to an embodiment of the present invention and shown in the "Code Portion For FIG. 11.txt" file of the incorporated computer program listing appendix;

FIG. 12: A listing of an exemplary location transparency interface of the CCB according to an embodiment of the present invention and shown in the "Code Portion For FIG. 12.txt" file of the incorporated computer program listing appendix;

FIG. 13: A listing of an exemplary admin interface of the CCB according to an embodiment of the present invention and shown in the "Code Portion For FIG. 13.txt" file of the incorporated computer program listing appendix;

FIG. 14: A schematic view of an exemplary broker system comprising CCB agents according to an embodiment of the present invention.

5. DETAILED DESCRIPTION

FIG. 1 shows an exemplary client (the 'ACI Broker Client') according to the prior art connecting to a broker via a broker stub. In the prior art, a plurality of agents (not shown in FIG. 1) are typically located between one or more brokers and a user interface for controlling the brokers, which leads to limited administration functionality due to the great number of agents that must be configured and maintained. An agent in this context is a program that steers and controls the brokers, i.e. it can be used for starting, stopping and configuring the brokers. The user interface may be implemented in a component within the network called "system management hub". Typically, one or more agents need to cooperate to perform a certain processing task. Among other tasks, the agents serve for displaying dialogs within a user's web browser. In the prior art, the source code of the plurality of agents is typically at least partly redundant. This implies an increased maintenance effort, since errors within the code have to be corrected in different locations throughout the network, i.e. in each individual agent.

FIG. 2 shows an example of a heterogeneous network according to the prior art. As can be seen, a broker connects two clients with two servers. The left-hand ACI broker client in FIG. 2 is adapted for communicating using the ACI (access control interface) protocol, while the right-hand RPC client is adapted for communicating using the RPC (remote procedure call) protocol. Accordingly, the broker shown in FIG. 2 is connected to an ACI server and to an RPC server. It should be appreciated that administering, i.e. configuring and maintaining, a broker such as the broker shown in FIG. 2 is highly complex, among other factors due to the different communication protocols required to be understood by the broker. This difficulty is even increased if not only one broker, but a plurality of brokers has to be maintained within a heterogeneous network.

In the following, a presently preferred embodiment of the invention is described with respect to a broker system as schematically shown in FIG. 4. As can be seen, the present invention provides a configuration & controlling broker (CCB) 1. The CCB 1 is connected to a plurality of brokers 20. Each broker 20 connects clients 10 with servers 30, wherein the clients 10/servers 30 may be local and/or remote clients/servers, i.e. computers located within the broker system of the CCB 1 or outside of the broker system of the CCB 1, respectively. Furthermore, one or more CCB client agents 12 may be provided that have connections to the CCB 1, as well as connections to the other brokers 20 within the network, if necessary. The CCB client agents 12 may serve for providing functionality for configuring and steering the CCB 1. It should be appreciated that also mainframe brokers may establish a connection to the CCB 1, since the CCB 1 is capable of automatically detecting newly started brokers, as will be described in more detail further below.

As will be described in more detail in the following, the CCB 1 enables a complete overview over the whole network as well as control and administration (i.e. configuration and maintenance) capabilities over its participants, i.e. the various clients 10, servers 30 and brokers 20. Preferably, none of the brokers 20, servers 30 and clients 10 is allowed to perform any kind of processing without proper authorization by the CCB 1. Furthermore, no user may perform a logon to one of the clients 10, brokers 20 or servers 30 without authorization by the CCB 1.

In one aspect, the CCB may be implemented as a callable RPC server, i.e. the processing logic of the present invention is performed by a configuring & configuration (C&C) service that runs as a distinct process on an RPC server. However, running the C&C service as distinct process may result in restricted performance, since the C&C service has to communicate with the CCB over a socket interface. In a preferred embodiment of the present invention, the C&C service is therefore implemented as internal C&C service 11 (i.e. on the computer of the CCB 1), as schematically shown in FIG. 3. Due to this architecture, internal functionality of the CCB 1 may be used without additional overhead. Furthermore, the internal C&C service 11 may generate CCB ACI calls, which may be distributed to a plurality of worker threads/processes of the CCB in order to increase the performance of the CCB. To this end, a corresponding control block may be created, which is processed within the CCB 1 by another worker. As a result, no complicated and inefficient communication over a socket interface is necessary, which is especially advantageous when processing huge amounts of data, such as a download of huge log files.

As can be seen in FIG. 4, the CCB 1 is adapted for storing CCB configuration data 100 in a local file 110 and/or an LDAP directory 120. The CCB configuration data 100 comprises configuration settings that define the properties of the CCB 1. In one aspect of the present invention, the CCB 1 may further comprise broker configuration data 200 that, in addition to broker configuration data 200 of ordinary brokers 20, comprises a variable 'RUNMODE' with the value 'ADMIN' to indicate that the respective broker functions as a CCB 1. The local file 110 may, contrary to the example depicted in FIG. 4, be stored directly within the CCB 1.

The CCB 1 may access a configuration file 130, such as a configuration file 'xds.ini', which determines where to store the CCB configuration data 100. The CCB 1 may be adapted for modifying the configuration file 130, so that the storage location of the CCB configuration data 100 can be switched from the local file 110 to the LDAP directory 120 and vice versa during runtime of the CCB 1. During a switch, old existing data may be deleted and the current data may be saved. Alternatively, the CCB 1 may be adapted for storing the CCB configuration data 100 in both the local file 110 and the LDAP directory 120 simultaneously. This is especially advantageous, since in case the local file 110 (or the LDAP directory 120) is lost, e.g. due to a hardware crash, the CCB configuration data 100 can be automatically recovered from the LDAP directory 120 (or the local file 110).

In the following, various aspects of the present invention are explained in more detail. It should be appreciated that the present invention is directed to broker systems comprising all of the following aspects, but also to broker systems implementing only some of the aspects described below.

Configuration of the CCB

In an exemplary implementation, during initialization of the C&C service 11 (and/or the CCB 1), a shared library erx.dll with the necessary RPC runtime is loaded. After initialization, the C&C service is started in RUNMODE=ADMIN via the rpccis.dll. In one aspect of the invention, the CCB 1 may in this context load during startup its broker configuration data 200 (comprising the RUNMODE=ADMIN property) and may then load its CCB configuration data 100. The CCB 1 may have a BROKERID=ETBSRV. Furthermore, the CCB 1 may provide a TCP port, e.g. with the port number 57707, which is preferably only accessible via localhost, i.e. only from the local computer of the CCB 1. The CCB 1 may further provide an SSL port, e.g. with the port number 57708, which is preferably accessible from any other computer within the network. Access to the SSL port may be controlled via corresponding SSL certificates.

The C&C service 11 (and/or the CCB 1, respectively) loads its configuration, i.e. the CCB configuration data 100 from the local file 110 and/or the LDAP directory 120. In an exemplary implementation, all broker configuration data 200 (configuration files (also called attribute files), SSL certificates and/or log files) of the brokers 20 within the network is located in an EntireX directory 40, more specifically in one configuration directory for each broker 20. An exemplary directory structure is 'config/etb/<brokerID>', wherein <brokerID> denotes an identifier of the respective broker 20.

In one aspect, the CCB 1 may be adapted for downloading configuration data of a remote broker 20 into the broker configuration data 200. Since such downloaded broker configuration data could be manipulated, the CCB 1 preferably uses its own broker configuration data 200 and/or its CCB configuration data 100 for the further processing. The CCB 1 may be further adapted to compare the downloaded broker configuration data with its stored broker configuration data 200 in order to detect manipulations. Preferably, each remote broker has its own storage medium 40, such as an own EntireX directory.

The CCB 1 scans the storage medium 40, i.e. in the above example the directory structure of the EntireX directory 40, for new or deleted broker configuration data 200 and synchronizes the broker configuration data 200 with the CCB configuration data 100. To this end, the CCB 1 stores new broker configuration data 200 into the CCB configuration data 100 and deletes old broker configuration data 200 (i.e. broker configuration data 200 comprised in the CCB configuration data 100 that is no longer present in the storage medium 40) from the CCB configuration data 100. This aspect represents a further backup level provided by the present invention. In case the CCB configuration data 100 within the local file 110 and/or the LDAP directory 120 is lost, a re-scan may be performed in order to rebuild this information. It should be appreciated that this aspect of the invention may be implemented independently from the other aspects described herein.

FIG. 4 further shows an optional backup CCB 1', which may serve for storing a further copy of the CCB configuration data 100 of the CCB 1. It should be appreciated that more than one backup CCB 1' may be provided in order to further increase the availability of the overall system. The one or more backup CCB 1' therefore serves as an additional backup environment. An optional replicator service (not shown in FIG. 4) may be provided that copies the CCB configuration data 100 from the CCB 1 to the backup CCB 1' periodically, in real time or in any other suitable manner. Moreover, a further backup layer may be provided in that at least one of the brokers 20 may also comprise the configuration data (see below) of the CCB 1. Therefore, in case the CCB 1 as well as the one or more backup CCB 1' is unavailable, the necessary data may be retrieved from the one or more brokers 20.

In summary, the preferred order in which a client 10 and/or a server 30 retrieves the (subset of) CCB configuration data comprises first trying to receive the data from the CCB 1. If the CCB 1 is unavailable, the one or more backup CCBs 1' may be contacted (if present). In case also the backup CCBs 1' are unavailable, the client 10 and/or the server 30 may contact one of the brokers 20.

In an exemplary implementation, each service (i.e. a process such as a broker 20, server 30 or any other program) is provided with a distinct 'CCB key'. Each process may comprise an environment that indicates the necessary configuration data of the respective process, such as environment variables, command line parameters and/or a working directory of the process. The CCB 1 enters itself (e.g. as 'ETBSRV') into the CCB key. The CCB key may be hierarchically structured and may comprise a further key for the environment and the rule set (see further below). An exemplary environment key of a broker 20 'ETB001' is 'localhost.12345/ETB001/Environment', an exemplary rule set key is 'localhost.2345/ETB001/Rules'.

The following is an excerpt of possible configuration settings and corresponding values, which may be comprised in the CCB configuration data 100 of the CCB 1 and/or the broker configuration data 200 of the brokers 20:

| Value name | Value |
|---|---|
| SVC_TYPE | "BROKER" | "BROKER-INSTANCE" |
| // e.g. local/remote Broker | |
| SVC_SERVICE_NAME | "<BrokerId>"|"<ServiceId>" |
| // unique service name | |
| SVC_PID | "PID" |
| // service process id | |
| SVC_STARTABLE | "YES|NO" |
| // service is a executable binary | |
| SVC_PROG1 | "etbnuc.exe" |
| // service executable | |
| SVC_PROG2 | "etbcmd.exe" |
| // helper process for shutdown service | |
| SVC_SHUTDOWN_BY_SIGNAL | "YES|NO" |
| // NO = shutdown via helper process | |
| SVC_SHUTDOWN_SIGNAL | "3" |
| // Signal number (UNIX) or named Pipe (Windows) | |
| SVC_AUTOSTART | "YES|NO" |
| // service autostart after boot or CCB restart | |
| SVC_WORKDIR | "%EXXDIR%/config/etb/<BrokerId>" |
| // working directory | |
| SVC_CONFFILE | "%SVC_WORKDIR%/etbfile.atr" |
| // attribute/configuration file | |
| SVC_LOGFILE | "%SVC_WORKDIR%/etbfile.log" |
| // log file | |
| SVC_STDERR | "%SVC_LOGFILE%" |
| // stderr into log file | |
| SVC_PATH | "${PATH}" |
| // path settings, if needed | |
| SVC_LD_LIBRARY_PATH | "${LD_LIBRARY_PATH}" |
| // library path settings, if needed | |

-continued

| Value name | Value |
|---|---|
| SVC_PROG1_ARGS | "\"%SVC_PROG1%\" −d −y<br>\"%ETB_CMDLOG1%\" −z<br>\"%ETB_CMDLOG2%\"" |
| SVC_PROG1_ENV | "%SVC_PATH% ETB_ATTR=%SVC_CONFFILE%" |

If, for example, a new process (e.g. on a broker 20) is to be started, the CCB 1 replaces the placeholders within the above variables with actual values. In the above example, placeholders between two %-signs are replaced with the corresponding values. To this end, the data is scanned beginning at the root key (i.e. the top-most key in the hierarchy) and replaced with the value that is found last. For example, if the value for the placeholder % EXXDIR % is found under the root key, any occurrence of % EXXDIR % is replaced with the corresponding value. Placeholders of the form '${namer}' are replaced with environment variables of the underlying operating system.

In order to start a process, only the command line, the environment variables and the working directory may be required. To this end, the keys SVC_PROG1_ARGS, SVC_PROG1_ENV and SVC_WORKDIR (see above) are inspected. The underlying operating system may then start the process based on this information. Authorization rules (see further below) may be stored and processed in a similar manner.

The CCB 1 is in a further aspect adapted for automatically configuring the brokers 20 during runtime. To this end, each broker 20 may provide an interface (such as a command and information services (CIS) interface that may be called for configuring the broker 20 e.g. for changing a trace level of the respective broker 20 during runtime. The CCB 1 may further provide an API (application programming interface) comprising interfaces for configuring the broker system and all of its participants. The interfaces of the API, which will be described in more detail further below, may be provided in the form of a wizard, i.e. a guided dialog through the configuration, and/or in the form of an expert mode allowing to edit each of the configuration settings individually.

For example, a broker 20 may receive a command for changing the number of worker threads to another value. The broker 20 may then change this number during runtime. In addition, also the attribute file (the broker configuration data of the respective broker 20) may be changed in order to be able to restart the broker 20 with the new number of worker threads in the future.

Security and Authorization Rules

The CCB 1 may in one aspect maintain one or more authorization rules 150 (cf. FIG. 4) for steering the processing of the brokers 20, servers 30 and clients 10 within the network. The authorization rules 150 are preferably modifiable during runtime of the CCB 1. Authorization rules 150 for controlling access privileges of the brokers 20, clients 10, servers 30 and/or users of these components may be created and/or modified by the CCB 1 during runtime depending on the availability of the brokers 20, clients 10 and/or servers 30. Furthermore, a manual editing and creation of authorization rules 150, e.g. by administration users, may be provided. Moreover, the steering of access privileges for services and/or applications within predetermined time windows is possible, as will be explained in more detail further below.

Furthermore, each authorization rule 150 may be assigned a security level, e.g. within a range of 0 (=insecure) and 10 (=maximum security). The CCB 1 may also be assigned a security level, so that an authorization rule 150 that has a security level different from (or below) the security level of the CCB 1 cannot be activated by the CCB 1. The following listing is an exemplary data structure for an authorization rule 150:

| | |
|---|---|
| struct 'RULE_GENERAL' is | |
| define data parameter | |
| 1 Category | (A32) |
| 1 RuleName | (A32) |
| 1 Level | (I4/V) |
| 1 CategoryList | (AV/V) |
| 1 RulesList | (AV/V) |
| 1 Rule | (AV/V) |
| and more | |
| end-define | |

As can be seen, an authorization rule 150 may comprise a name ('RuleName') and/or a security level ('Level'). 'Rule' may comprise the actual rule and/or a plurality of rules, which may be processed in the order of occurrence. Furthermore, 'Category' may define a category, e.g. "CCB-LEVEL".

If e.g. the CCB 1 is started with an option CCB-LEVEL=5, it searches for an authorization rule 150 of the category 'CCB-LEVEL' with the level 5. From the information comprised in the fields 'CategoryList' and 'RulesList', the CCB 1 may then build its rule set, i.e. the set of suitable authorization rules 150 to employ. This way, it is possible to define different sets of CCB configurations, which may be switched during runtime. Additionally or alternatively, a fallback onto the previous configuration is possible in case of failure of the current configuration. In another aspect, users are enabled to define custom categories. If the CCB 1 is e.g. assigned the security level 0 (=insecure) during start-up, the CCB 1 may be adapted for ignoring all further authorization rules 150.

An authorization rule 150 may comprise or may be linked to one or more arbitrary complex programs/applications (e.g. implemented in C/C++ or any other programming language). A custom application may in one aspect provide a custom CCB agent (see further below) for validating the authorization rules 150. In this scenario, the CCB 1 maintains the authorization rules 150 and provides them to the CCB agent.

In case the CCB 1 determines that an authorization rule 150 cannot be executed, e.g. due to lacking authorization of a shared library of a custom application, a special value such as 'DefaultUnusable' may be returned as a result of the corresponding authorization rule 150. The special value may be employed for any authorization rule 150 in order to determine whether the overall system is executable in the case of failure or whether it has to be stopped.

The following is an exemplary authorization rule 150 for a broker process 'ETB001' (the values after the "//" signs represent the values of the corresponding authorization rule fields):

```
struct 'RULE_GENERAL' is
    define data parameter
        1 Category          (A32)    // 'BROKER'
        1 RuleName          (A32)    // 'ETB001'
        1 Level             (I4/V)   // 5,6
        1 CategoryList      (AV/V)   // 'SERVICE
                TYPE=BROKER'
        1 RulesList         (AV/V)   // 'local-
                host.12345/BrokerTemplate1/Rules'
        1 Rule              (AV/V)   //
                'BROKER_ATTRIBUTES,BROKER_START'
        1 Action            (AV/V)   // 'BROKER_START'
        1 DefaultUnusable   (I1)
        and more
    end-define
```

As can be seen, 'CategoryList' comprises an entry 'SERVICE TYPE=BROKER'. Accordingly, all authorization rules 150 of the category 'SERVICE' for the type 'BROKER' are validated.

The CCB-key (see further above) for the broker rules may also comprise value names and values that comprise the values and/or placeholders for the broker attributes, such as in the following example:

```
ETB_BROKERID       '${RuleName}'
    // BrokerID
ETB_TRANSPORT      'SSL,SSL,SLL'
    // TCP/SSL,... port 1 - 3
ETB_HOSTNAME       'localhost, host1, host1'
    // hostnames for port 1 - 3
ETB_PORTS          '1111,2222,3333'
    // port 1 - 3
ETB_SECURITY       'YES'
    // Security enabled
ETB_ADMINS         '%ETB_ADMIN_LIST%'
    // administrators
ETB_TIMECONTROL    'MEZ_0600_2000'
    // runtime of the broker
ETB_LOCATION       'WORLDWIDE'
    // location of the broker
RULE_ACTIONS       'BROKER_ATTRIBUTES,
                   BROKER_START, BROKER_STOP,
                   BROKER_RESTART'
```

In the above example, 'RULE_ACTIONS' determines the allowed actions. The 'RulesList' (see the above exemplary authorization rule 150 comprises in this example the CCB-key for rules of the broker ETB001 using a template 'BrokerTemplate1'. To this end, the authorization rules 150 may be defined for more than one broker by a template, so that the corresponding CCB-key only comprises a pointer to the template. The field 'Action' with the value 'BROKER_START' defines that a starting of the broker is to be performed as action. The rule for the broker start may e.g. comprise 'BROKER_ATTRIBUTES, BROKER_START'. This indicates that, prior to the broker start, the rule corresponding to the broker attributes has to be validated. To this end, 'BROKER_ATTRIBUTES' may validate, whether the broker configuration file (the broker attribute file) has to be replaced and may e.g. create a local file 110, in case the broker is located on the same computer. Otherwise, the created file may be transferred onto the target computer.

In case any user should be allowed to start the broker in the above example, a further rule entry may be provided:

```
ETB_ADMINS_START_BROKER    '##ALL_USER##'
    // Administrators
```

This entry may serve for allowing any user to start the brokers that use the template 'BrokerTemplate1'.

In another aspect of the present invention, each category may be processed by one or more individual rule validation program. The one or more corresponding rule validation program may be implemented in the CCB 1 or in a corresponding CCB server agent (see further below). In the latter case, the CCB 1 maintains the authorization rules 150 and modifications to the rules may be performed via a user interface provided by a corresponding CCB client agent.

Based on 'ETB_TIMECONTROL', the CCB 1 may generate a data structure suitable for steering a time-triggered processing of the corresponding action (e.g. to be used by a crontab of the CCB 1). In the following example, the broker would be started automatically at 6.00 MEZ and stopped at 20.00:

ETB_TIMECONTROL 'MEZ_0600_2000'

Accordingly, the rule validation is in this example processed by a program of the category 'TIMECONTROL'. This program may further define the complete syntax for all variants of the TIMECONTROL string.

The following listing shows another exemplary authorization rule 150:

```
struct 'RULE_GENERAL' is
    define data parameter
        1 Category          (A32)    // 'BROKER'
        1 RuleName          (A32)    // 'ETB001'
        1 Level             (I4/V)   // 5,6
        1 CategoryList      (AV/V)   // 'SERVICE'
        1 RulesList         (AV/V)   // 'local-
                host.12345/BROKER/BrokerTemplate1/
                Rules'
        1 Rule              (AV/V)   // '##*##'
        1 Action            (AV/V)   // '*'
        1 DefaultUnusable   (I1)
        and more
    end-define
```

In this rule, also the actions 'BROKER_STOP', 'BROKER_RESTART' and 'BROKER_ATTRIBUTES' are affected. Only 'BROKER_START' has its own rule. '##*##' is a placeholder for the corresponding action, i.e. if the action is 'BROKER_STOP', the rule may be used for 'BROKER_STOP'.

In summary, the CCB 1 provides, maintains and controls authorization rules 150 preferably for all components (clients 10, servers 30, brokers 20, services, applications, users and/or administrators) within the heterogeneous network.

By default, each command and/or function provided by the CCB 1 may be callable by any component via the API (see below) of the CCB 1. The authorization rules 150 of the CCB 1 effectively restrict the access to these commands and/or functions.

For example, a command GetAllKnownServices( ) provided by the CCB 1 may provide a list of all services known to the CCB 1 and/or their current status (e.g. started, stopped, etc.). The authorization rules 150 of the CCB 1 allow for an especially flexible control over which participant may be allowed to call this command. E.g. authorization rules 150 may be defined that allow calling the GetAllKnownServices( ) command by normal users, i.e. users other than administrators.

A further command StartService( ) may be provided by the CCB 1, that accepts a service name as parameter to trigger the respective service to be started. Also here, the authorization rules 150 may dictate that the command StartService( ) is allowed to be called only by certain users, by all administrators, only by certain administrators, or in any other suitable manner. Furthermore, different authorization rules 150 may be defined for each service name parameter value, i.e. the CCB 1 may employ different authorization rules 150 depending on which service is to be started via the StartService( ) command.

Each time an API call occurs, i.e. each time a command of the CCB 1 is called, the CCB 1 may search its authorization rules 150 in order to determine whether a rule exists for the command call. The command is then processed by the CCB 1 only if no rule exists, or if a rule exists and the result of the validation of this rule is positive.

Authorization rules 150 may e.g. be defined in accordance with the following factors:
Who: users, administrators, etc.
Where: location, common
How: access over a PC system, mainframe, etc.
Whereby: used transport protocol, e.g. TCP, SSL, HTTP, etc.
What: category (see further above)
When: rule-based time windows (see further below)
Whom: rule-based broker list/services It should be appreciated that any other suitable factors may be employed for defining the authorization rules 150 of the CCB 1. With respect to the exemplary CCB-key value shown further above, the following listing shows the correspondence between the value names and the above factors:
Who: ETB ADMINS
Where: ETB_LOCATION (worldwide access in the example)
How: n/a
Whereby: ETB_TRANSPORT
What: category 'BROKER'
When: ETB_TIMECONTROL
Whom: ETB BROKERID Furthermore, the CCB 1 may be in one aspect adapted for employing the authorization rules 150 according to a "whitelist" (i.e. by default everything is forbidden and the rules represent exceptions which are allowed), according to a "blacklist" (i.e. by default everything is allowed and the rules define exceptions which are forbidden) and/or a combination of both.

In case the authorization rules 150 are stored in an LDAP directory such as the LDAP directory 120, the CCB 1 may activate and disable user accounts on different clients 10, servers 30 and brokers 20, e.g. for a predefined time span.

The following is an example of an authorization rule 150. If a broker 20 is to be started, the corresponding authorization rules 150 of the category 'SERVICE' may be validated prior to this action. The function call for starting the broker 20 may to this end comprise a pointer onto the corresponding authorization rules 150.

Prior to the function call execution, the data structure (i.e. the authorization rule(s) 150) may have been initialized by the CCB 1 with data of the caller, its location, the value 'SERVICE' as category, a time stamp and/or the name of the broker 20 to be started. Then, the rule validation may be performed for authorization rules 150 with the category 'SERVICE' for the action 'START_SERVICE'. The rule validation may check, whether the authorization rules 150 allow the starting of the broker 20, which may e.g. comprise checking whether the caller is allowed to administer the broker 20, checking whether the caller is allowed to trigger the action from outside its network and/or checking whether the action request is within an to allowed time window. If all validations are answered in the positive, the corresponding action, in this case the starting of the broker 20, is performed at the end of the rule validation.

A second example is the starting of a process that is supposed to connect via a client stub 15 to a service of a broker 20, e.g. for exchanging data. Similar than in the example above, the data of the caller, its location, its operating system, its connection type (e.g. TCP), a category 'BROKER', a time stamp and/or a broker service name may be determined. Accordingly, the rule validation is performed for the authorization rules 150 of the category 'BROKER' with the action 'service name'.

CCB Agents

CCB agents may be used for extending the capabilities of the CCB 1. CCB agents may be classified into CCB client agents 12 and CCB server agents 13 (cf. FIG. 4). A CCB client agent may represent an interface between the presentation layer (i.e. a graphical user interface of the controlling CCB 1, and the other components within the broker system) and the CCB 1. This aspect has the advantage that the CCB 1 itself does not have to be aware of the added functionality provided by the CCB agents, but only has to maintain corresponding authorization rules 150.

CCB Client Agents

A CCB client agent may provide an interface between the presentation layer (i.e. a graphical user interface of the controlling CCB 1, and the other components within the broker system) and the CCB 1. To this end, the CCB client agent may provide the user interface itself, or may serve as a proxy between a web-service user interface and the CCB 1. As can be seen in FIG. 14, a variety of CCB agents may be provided to extend the presentation layer.

CCB Server Agent

CCB server agents may be used for extending the functionality of the CCB 1. A CCB server agent may e.g. collect status information about the underlying operating system.

CCB Client/Server Agent

An example for the interworking between CCB client agents and CCB server agents is described in the following referring to a steering of the openssh protocol.

Openssh is a terminal application for establishing a secure connection between two computer systems. This includes e.g. the execution of programs on a first computer triggered by a second (remote) computer in a terminal emulation as well as file transfer, port forwarding, etc. The necessary authentication may be performed via SSL certificates without the need of a password input.

However, openssh does not provide a way for controlling which applications/programs are allowed to be executed, which user is allowed, and to which remote computer it is allowed to connect. Consequently, openssh may easily be used for malicious actions, such as exposing confidential data over the internet.

In one aspect, the present invention therefore provides a way of allowing secure connections only for certain predefined applications/programs. To this end, a CCB client agent is provided for implementing the user interface and a CCB server agent is provided for providing the openssh service on the target computer according to the authorization rules 150 dictated by the CCB 1.

For example, in case a user wants to start an application/program on the target computer, the openssh CCB client agent connects via a corresponding broker service to the openssh CCB server agent. The openssh CCB server agent then checks the authorization rules 150 dictated by the CCB 1 to determine whether the requested program is allowed to be started. If this is the case, the CCB server agent may create a private and a public SSL key which are needed for a password-less connection. Moreover, based on the authorization rules 150 a configuration file for the SSH daemon (i.e. the program implementing the ssh functionality) may be created. It is to be noted that the CCB 1 itself does not have to be able to interpret the options of the configuration data, but that this is the responsibility of the CCB server agent. Accordingly, the CCB server agent uses the options to create the actual configuration file. An exemplary option may be port forwarding, a connection for an X-server, or any other option understood by the ssh daemon.

The ssh daemon may then be started with a port dictated by the CCB server agent. The key and the port number may be sent to the openssh CCB client agent in return. The CCB client agent may then use the received key to connect to the openssh daemon only within a pre-defined time window, e.g. of 15 seconds. After the time window has lapsed, the CCB server agent may stop the openssh daemon in order to prevent any further connections. In case a connection has been established within the pre-defined time window, this existing connection may however be maintained. It should be appreciated that the above aspect of the present invention may be advantageously used with other protocols, such as sshftp, sshcp, sshfs, etc.

Broker Broadcast Message

In a further aspect of the invention, each broker 20 may have to register with the CCB 1 with a broadcast message in order to participate in the network. A broadcast message is especially advantageous in this context, since the broadcast message may be received by the CCB 1 as well as the backup CCB 1', so that in case the CCB 1 is unavailable (see further below), the backup CCB 1' may answer the broadcast message. The CCB 1 may be adapted to wait for a predefined timeframe, e.g. 60 seconds, after the start of the CCB 1. During this timeframe, the CCB 1 may listen to incoming broadcast messages from the brokers 20. After this timeframe, e.g. after 90 seconds, the CCB 1 may be adapted for sending a command to all brokers 20 which are not already started and which have their autostart option set (i.e. SVC_AUTOSTART=YES; cf. the listing of configuration values further above), wherein this command triggers the respective brokers 20 to start.

In order for a broker 20 to contact the CCB 1, the broker 20 may use a network address of the CCB 1, such as a URL. The URL of the CCB 1 may be stored in the field CCB_URL in the broker configuration data 200 of the broker 20, or may alternatively be received via command line. The newly started broker 20 then sends a broadcast message to the CCB 1, as described above, wherein the broadcast message may comprise the identifier of the broker 20 (field BROKERID), the network address of the broker 20 (field BROKERURL) and/or further data such as broker information service, TCP information service and/or SSL information service data. Depending on the used protocol, also the SSL parameters may be sent within the broadcast message. Using the BROKERURL, the CCB 1 and/or any broker agents may establish a connection to the broker 20. Furthermore, the SSL certificates may be sent to the respective clients 10 and/or C&C clients. The broadcast message is preferably repeatedly sent by the broker 20 within a predefined time interval. The network connection between the broker 20 and the CCB 1, e.g. a TCP/IP connection, is preferably kept open, in order to immediately detect connection failures or the stopping of the broker 20.

Furthermore, the broker 20 may via the broadcast message also transmit information about its processing load, the network traffic or further information. The CCB 1 may then be adapted for providing, i.e. starting a further broker 20 (cf. 'load balancing' further below for more details).

Client Broadcast Messages and Client Stub

In another aspect, each client 10 may be linked to a client stub 15 that represents the interface of the respective client 10 to the respective broker(s) 20 (cf. FIG. 4). The clients 10 may also be adapted for sending, via their client stub 15, a broadcast message to the CCB 1, preferably after the start of the client 10. In response, the client 10 may receive a subset 100' of the CCB configuration data 100 and/or a subset 150' of the authorization rules 150 from the CCB 1 and/or store this data locally at the client 10. The subsets may comprise only the portion of the configuration data and/or authorization rules relevant to the requesting client 10.

Additionally, each client 10 may have to request authorization from the CCB 1 before being allowed to establish a connection to a broker 20. To this end, the client stub 15 may be adapted for preventing any incoming/outgoing communication to/from the client 10, if the stored configuration data and/or authorization rules do not allow such communication. Detailed examples of the communication sequences between the CCB 1, the clients 10 and the brokers 20 are described in more detail below with respect to FIGS. 5-8.

However, in case the CCB 1 is unavailable, e.g. due to a network disconnection or for another reason, the client 10 is nevertheless capable of establishing connections to a broker 20 according to the authorization rules 150 dictated by the CCB 1. This is because, if the CCB 1 is unavailable, the client 10 may use its stored subset of configuration data and/or authorization rules to establish allowed connections, i.e. connections that conform to the authorization rules. As soon as the CCB 1 is available again, the client 10 may re-connect to the CCB 1 (preferably via the client stub 15) in order to update its subset of configuration data and/or authorization rules.

Server Broadcast Messages and Broker Stub

In yet another aspect, each server 30 may be linked to a server stub 35 that represents the interface of the respective server 30 to the respective broker(s) 20 (cf. FIG. 4). The servers 30 may also be adapted for sending, via their server stub 35, a broadcast message to the CCB 1. In response, the server 30 may receive a subset 100' of the CCB configuration data 100 and/or a subset 150' of the authorization rules 150 from the CCB 1 and/or store this data locally at the server 30. The subsets may comprise only the portion of the configuration data and/or authorization rules relevant to the requesting server 30.

Additionally, each server 30 may have to request authorization from the CCB 1 before being allowed to establish a connection to a broker 20 in order to provide its services through the broker 20. To this end, the server stub 35 may be adapted for preventing any incoming/outgoing communication to/from the server 30, if the stored configuration data and/or authorization rules do not allow such communication.

However, in case the CCB 1 is unavailable, e.g. due to a network disconnection or for another reason, the server 30 is nevertheless capable of establishing connections to a broker 20 according to the authorization rules 150 dictated by the CCB 1. This is because, if the CCB 1 is unavailable, the server 30 may use its stored subset of configuration data and/or authorization rules to establish allowed connections, i.e. connections that conform to the authorization rules. As soon as the CCB 1 is available again, the server 30 may re-connect to the CCB 1 (preferably via the server stub 35) in order to update its subset of configuration data and/or authorization rules.

Tunneling and Port Forwarding

The CCB 1 may in another aspect of the present invention provide tunnelling and/or port forwarding, e.g. via dedicated CCB server agents. This functionality may e.g. be provided by a 'tunnelling/port forwarding CCB server agent' and/or by a broker 20.

The following is an example of the tunnelling/port forwarding capabilities of the CCB 1. In this example, a data repository such as a CVS (Concurrent Versions System) or Subversion repository may be provided on a server 30 at the address 'localhost<portnumber>'. Since the address is 'localhost', no access from a remote computer is possible. A corresponding CCB client/server agent pair may therefore provide a 'tunnel' between 'localhost<portnumber>' on the computer of the server 30 and 'localhost<portnumber>' of a computer of a client 10. It is to be noted that no access to the corresponding ports from outside is possible.

Accordingly, the access control is extended to remote applications (i.e. the client 10). The CCB 1 may again control the access control via control of the corresponding connections, however, without having to possess knowledge about the underlying program (CVS or Subversion in this example).

Additionally or alternatively, the tunnelling and/or port forwarding may allow the blocking and/or unblocking of pre-defined broker ports. Therefore, the respective broker does not have to be stopped and restarted, instead only the access is prevented or allowed. Furthermore, a security key needed for the access may be changed as necessary.

Load Balancing

In another aspect, the CCB 1 may be adapted for performing rule-based load balancing, i.e. the processing workload may be distributed among and transferred between available brokers 20 and/or services as needed. Therefore, the clients 10 may connect rule-based. The servers 30 may start their services as necessary, e.g. upon request, wherein the CCB 1 provides the necessary rules. The CCB 1 may start further servers 30 if necessary. The processing of automated applications may be delayed by the CCB 1. Automated applications may be started depending on the load. Server 30, services and/or applications may be paused by the CCB 1.

The following is an example of an authorization rule 150 for rule-based connecting of a client 10:

```
struct 'RULE_GENERAL' is
    define data parameter
        1 Category          (A32)    // 'BROKER-STUB'
        1 RuleName          (A32)    // 'TEST-BROKER'
        1 Level             (I4/V)   // 5,6
        1 CategoryList      (AV/V)   // ''
        1 RulesList         (AV/V)   // 'local-
                host.12345/BROKER-STUB/TEST-BROKER-
                RULES/Rules'
        1 Rule              (AV/V)   // 'RANDOM'
        1 Action            (AV/V)   // ''
        1 DefaultUnusable   (I1)
        and more
    end-define
```

The actual rules can then be looked up by the CCB 1 under the key 'localhost.12345/BROKER-STUB/TEST-BROKER/Rules'. The following listing shows examples of such rules:

```
RULE_NAME              'TEST-BROKER-LIST'
    // rule name
ETBLIST_DEFAULTRULE    'PERCENTAGE 50 25 25'
    // default stub rule
ETBLIST_BROKERURL      'etb1:1111,etb2:1111,etb3:1111'
    // broker URLs
ETBLIST_BROKERRULES    'ETB_CRON_ETB1,
                        ETB_CRON_ETB2,
                        ETB_CRON_ETB3
    // rules
```

As can be seen, the rule 'TEST-BROKER' for broker stubs loads the rule list. This list comprises the list of all corresponding brokers 20 and/or their respective authorization rules 150. The exemplary default rule ('ETBLIST_DEFAULTRULE') defines a load balancing of 50%, 25% and 25% onto the brokers etb1, etb2 and etb3, respectively. Furthermore, 'RANDOM' is defined in the higher-ranking rule. In this case, the client stub 15 distributes the connections itself. In case e.g. 'LOAD' was defined instead of 'RANDOM', the CCB client stub would request from the CCB 1 the broker 20 with the least working load. ETBLIST_BROKERRULES may comprise further rules for the individual brokers 20. ETB_CRON_ETB1, ETB_CRON_ETB2 and ETB_CRON_ETB3 may therefore comprise further rules defining when the respective broker should be unavailable The following is an example of an authorization rule 150 for servers 30 starting their services as necessary, e.g. upon request:

```
struct 'RULE_GENERAL' is
    define data parameter
        1 Category          (A32)    // 'BROKER-SERVICE'
        1 RuleName          (A32)    // 'TEST-SERVICE'
        1 Level             (I4/V)   // 5,6
        1 CategoryList      (AV/V)   // ''
        1 RulesList         (AV/V)   // 'local-
                host.12345/BROKER-SERVICE/TEST-
                SERVICE-RULES/Rules'
        1 Rule              (AV/V)   // 'LOAD 60=70%
                300=30%'
        1 Action            (AV/V)   // ''
        1 DefaultUnusable   (I1)
        and more
    end-define
```

The actual rules can then be looked up by the CCB 1 under the key 'localhost.12345/BROKER-SERVICE/TEST-SERVICE/Rules'. The following listing shows examples of such rules:

```
RULE_NAME              'TEST-SERVICE-LIST'
    // rule name
ETBLIST_SERVICENAME    'CLASS/SERVER/SERVICE'
    // service name
ETBLIST_DEFAULTRULE    ''
    // default rule
ETBLIST_SERVICES
    'etb1:1111,etb2:1111,etb3:1111'
    // broker URLs
ETBLIST_SERVERRULES    'ETB_CRON_ETB1,
    ETB_CRON_ETB2,ETB_LOAD'
    // rules
```

The rule 'TEST SERVICE' for broker rules loads the corresponding rule list. This list comprises the list of all corresponding services and/or their respective authorization rules 150. The above example does not comprise a default rule.

Based on the rules in 'ETBLIST_SERVERRULES', the CCB 1 may start the services CLASS/SERVER/SERVICE. The third server with the rule ETB_LOAD (see the above listing) starts the broker services only if necessary. To this end, the CCB 1 may send a corresponding request to the server(s) 30. For this functionality, the server(s) 30 may use a CCB plugin. The request is sent as defined in the above-shown rule. There, LOAD 60=70% defines that the workload must not fall below 70% for 60 seconds in order to start the additional service. Similarly, the additional service is stopped again if the workload does not exceed 30% for a time interval of 300 seconds.

The following is an example for a delayed processing of automated applications. In case the CCB 1 notices a shortage in the processing of service requests, a waiting cycle may be inserted by the CCB 1 prior to each broker call. For example, a rule 'LOAD 60=75%=5 60=85%=25 60=90%=55' defines that a waiting cycle of 5 seconds is inserted if the workload exceeds 75% for 60 seconds, a waiting cycle of 5 seconds is inserted if the workload exceeds 85% for 25 seconds and a waiting cycle of 5 seconds is inserted if the workload exceeds 90% for 55 seconds. Additionally or alternatively, the application, server and/or broker service may also be completely paused.

The following is an example for starting automated applications depending on the workload. Therefore, the rules may comprise corresponding definitions. For example, a rule 'IDLE daily 300=90%' may serve for starting the respective application once a day if the idle time of the computer hosting the application exceeds 90% for 300 seconds.

Statistics

In a further aspect, the CCB 1 may be adapted for collecting statistics about the workload of the network, e.g. in a 5 minute granularity over 365 days a year. In one aspect, reoccurring peaks in the workload may be detected and the CCB 1 may be adapted for automatically starting further servers 30 and/or brokers 20 anticipatorily, i.e. before the next expected workload peak occurs. Based on the statistics, the CCB 1 may generate corresponding rules, which may be further refined manually if necessary. Exemplary questions that can be answered by the CCB 1 in this context are which application causes how much workload, or at what time does a hard drive scan of a virus scanner start (which can cause a considerable decrease in the performance of hard drive accesses within virtual operating systems).

The brokers 20 and/or client/server stubs may to this end provide the CCB 1 with the necessary information. Also the integration of servers without server stubs and/or custom applications is possible, e.g. via respective plugins. The CCB 1 preferably stores the information for a pre-defined time span and/or time interval. The following are examples of such statistic information:

```
struct 'STATISTICS_SYSTEM' is
  define data parameter
    1 TimeStamp        (A20)
    // 2009-11-11 11:11:00
    1 IdleTime         (I2/3)
    // idle time in percent min/avg/max
    1 CpuUsage         (I2/3)
    // CPU usage in percent min/avg/max
    1 maxMemory        (I4)
    // available memory in MB
    1 MemoryUsage      (I2/3)
    // Memory usage in percent min/avg/max
    1 StorageMounts    (AV/V)
    // Storage mount points
    2 StorageAccess    (I2/3/V)
    // Load min/avg/max (harddisk and via net) per mount
    2 FreeStorage      (I2/3/V)
    // Free storage per mount point
    1 NetworkSpeed     (I4)
    // Network speed in mbit / network adapter
    1 NetworkAccess    (I2/3)
    // Network usage in percent min/avg/max
    1 NumberOfSockets  (I4/3)
    // Number of used TCP sockets
    1 NumberOfProcesses (I4/3)
    // Number of processes
    2 IdleProcs        (I4/3)
    // Idle processes
    2 ...
    // more detailed process status information
    and more
  end-define
struct 'STATISTICS_SERVICE' is
  define data parameter
    1 TimeStamp        (A20)
    // 2009-11-11 11:11:00
    1 ServiceName      (A32)
    1 CpuUsage         (I2/3)
    // Service CPU usage in percent min/avg/max
    1 MemoryUsage      (I2/3)
    // Memory usage in percent min/avg/max by service
    1 StorageMounts    (AV/V)
    // Storage mount points used by service
    2 StorageAccess    (I2/3/V)
    // Load min/avg/max (harddisk and via net) per mount
    2 FreeStorage      (I4/3)
    // Network usage in Bytes/second min/avg/max
    and more
  end-define
(AV/V) == variable character string in a variable array
(I2/3/V) == I2 variable with 3-fold min/avg/max values
in a variable array
```

The following is an example for a system CCB server agent for Linux. In this example, the system CCB server agent collects data of the Linux operating system. It should be appreciated that a similar system agent may be provided for any hardware platform and/or operating system. The system agent may e.g. collect the system data (such as the idle time of the system, the CPU usage of all or certain pre-selected CPUs, maximum, used and/or free memory, etc.) each 1/10 second. A data storage may be determined for each mount, e.g. by determining the work load and free storage. In case the storage space is about to be exceeded, the CCB 1 may move the respective brokers, servers etc. onto another computer. A notification may in this scenario be provided to an administrator. In case the number of sockets is about to be exceeded, a proxy may be started on an external computer that bundles requests and therefore only occupies one connection on the computer. The CCB 1 may then change the corresponding list of available brokers, servers, etc., i.e. the affected process is removed from the list and the proxy is inserted. For example, a rule 'SYSTEM-SOCKETS 90% 50%' or 'PROCESS-SOCKETS 90% 50%' may steer the starting and/or stopping of the proxy. Additionally or alternatively, also process information of the underlying operating system may be used by the CCB 1.

The system agent may e.g. collect 10 data records per second and may e.g. calculate an average value per second. Additionally, also the minimum and/or maximum value per interval may be collected. Additionally, the CCB 1 may check whether the interval was followed. For example, in case during a particular interval of one second, no 10 values have been collected, this fact provides a hint on an increased workload of the system.

Monitoring

According to a further aspect, the CCB 1 can monitor the state of the network and its participants. The API provided by the CCB 1 may therefore provide commands that can be used by an application for graphically displaying the data monitored by the CCB 1.

To this end, the CCB 1 may in one aspect process the statistic information presented above and may generate data about the current state of the overall system.

A monitoring application such as a CCB client agent may request this statistics. For example, by using the command GetAllKnownServicesByType( ), all started processes, or alternatively, all started brokers, may be determined. In the latter case, a list of all corresponding servers per broker may be determined using GetAllKnownBrokerServer( ). The current status of a broker or a broker list may be determined using GetBrokerStatus( ). Accordingly, GetBrokerStatistics( ) may be used for requesting the statistic data of a broker or broker list in a pre-defined time interval. The status and/or statistics may also be requested for other types of processes, such as servers, RPC servers, custom applications, etc. (e.g. via GetProcessStatus( ) and/or GetProcessStatistics( ).

GetProcessStatusCritical( ) may be used for retrieving a list of processes running with a high workload or whose status is otherwise critical. The list may further comprise faulty processes.

GetProcessStatusWarning( ) may be used for retrieving a list of processes for which warnings exist. The CCB 1 may generate warnings e.g. when authorization rules 150 are compromised. For example, in case users are allowed to access a certain system only between 6.00 and 20.00 and in case a rule exists for override the afore-mentioned rule for 7 days (e.g. due to an inventory), the CCB 1 may generate a warning for the latter rule. In a further aspect, this warning may be disabled when creating the latter rule.

The CCB 1 may in a further aspect provide additional information needed for the presentation, since the monitoring application itself cannot know which values of the statistics and status data are to be considered normal or critical. To this end, the CCB 1 may for each data provide additional information about how to interpret the data. For example, in case a colored display of the information is desired, the additional information provided by the CCB 1 may comprise the following:

'STATUS 50% 70% 80% 90% 98%'

The monitoring application may then display the information in different colors, e.g. low workload (under 50%) in green, normal workload (up to 70%) in light yellow, high workload (up to 80%) in yellow, very high workload (up to 90%) in orange and critical workload (higher than 98%) in red. It should be appreciated that other color codings and percentages (or even absolute values) may be defined as needed.

Time Control

The CCB 1 is in a further aspect adapted for starting and/or stopping the brokers 20, servers 30 and/or clients 10 upon request, at certain predefined times or according to the rules of the CCB 1. Clients 10 and/or servers 30 may be granted authorization for processing their tasks only during predefined time windows (cf. the usage examples further below). For example, clients 10 at certain sites of an enterprise may only be granted authorization during the regular working schedule on workdays. Security-relevant application may only be authorized when they are required (security by non-availability). Another example is when a computer, such as a server 30 and/or a broker 20, undergoes maintenance every month on the first day of the month, the CCB 1 may be adapted for automatically starting servers 30 and/or brokers 20 on a backup computer on these days and the computer to be maintained can be shut down in time.

The following is an exemplary definition of a time window:

```
struct 'RULE_GENERAL' is
    define data parameter
        1 Category       (A32)    // 'TIME-CONTROL'
        1 RuleName       (A32)    // 'ETB001 Startup'
        1 Level          (I4/V)   // 5,6
        1 CategoryList   (AV/V)   // -
        1 RulesList      (AV/V)   // -
        1 Rule           (AV/V)
            // '*-*-*' 11:00:00 RULE=STARTUP-SERVICE'
            // '*-*-*' 11:59:00 RULE=STOP-
            SERVICE,OPTION=IMMED
        and more
    end-define
```

Accordingly, in this example the default broker 'ETB001' is started daily at 11.00 and stopped at 11.59 with an option 'IMMED' (=immediately). STARTUP-SERVICE and STOP-SERVICE defines a program call for starting and stopping the service, respectively.

The CCB 1 may maintain a table with all actions to be performed. To this end, the actions (such as starting and stopping) may be defined to be executed at predefined times, as shown above, e.g. via corresponding keywords such as 'daily', 'weekly', 'monthly', 'eachMonday', etc. Furthermore, the CCB 1 may be adapted for performing the execution depending on the workload. For example, in case a batch process is to be executed daily after 18.00 depending on the workload, an additional parameter such as "IDLE 300=30%" may be defined.

File Transfer

This aspect of the invention comprises an automatic exchange of security certificates such as SSL certificates, configuration files (attribute files) and/or log files among the CCB 1, the clients 10, the servers 30 and/or the brokers 30 within the network.

In one aspect at least one of the broker 20 may provide capabilities for performing a file transfer e.g. over RPC calls and/or its CIS interface. The management interface (described in more detail further below) may comprise the necessary data structures and functions. For a file transfer, it is necessary that a broker 20 and/or a CCB server agent with file transfer capabilities is running on the target computer. In case text files are to be transferred, the broker 20 may in one aspect convert the text files to a format suitable for the target computer. For example, if a broker attribute file is to be transferred from a Windows PC using the ASCII format to a z/OS mainframe computer, it may be converted to EBCDIC. Binary files are preferably not modified.

The following is an example of an automatic exchange of security certificates such as SSL certificates. The CCB 1 may be adapted for automatically generating SSL certificates via a service (process) of type 'SSL-GENERATOR'. In case other server processes also require SSL certificates, the file transfer described above may be used for the exchange of these certificates. The certificates may then be distributed to the corresponding brokers 20. In one aspect, each broker 20 may receive an individual certificate. Additionally or alternatively, each broker in a broker list may receive the same certificate, or all brokers may receive the same certificate. For example, in case a connection between a broker stub and a broker fails due to a faulty, wrong or expired certificate, the broker stub may request a current certificate from the CCB 1. If the broker stub is allowed to establish a connection to the broker, it may receive the certificate via file transfer. A new version of a certificate may be distributed as soon as it is available. To this end, the CCB 1 preferably comprises a working directory for each known broker 20 that stores the corresponding certificates.

The CCB 1 may then send the required certificates to the respective broker 20. In this context, it is preferred that the corresponding client stub requests the certificate itself, unless the client uses a CCB plugin. This CCB plugin may allow for a file transfer to be performed by the CCB 1 and/or the client stub (e.g. via a separate thread) in the background, i.e. without affecting other processing of the CCB 1 and/or the client.

In a further aspect, the change of a certificate on a broker 20 may be performed by moving the broker. To this end, a new broker is created that comprises a new SSL port and corresponding new certificates. If the new broker is started successfully and if the CCB 1 has established a connection using the new certificates, the configuration data of the broker is changed to the new broker. Subsequently, all necessary broker services, RPC servers, etc. are started based on the new connection data. Running servers may additionally or alternatively connect with the new broker, preferably if the CCB plugin is used and a corresponding event 'AddNewBroker' is received. This preferably happens before the CCB data is changed from the old to the new broker.

In another aspect, the change of a certificate on a broker 20 may be performed by starting a new port of the broker. The certificates are then used only for the new port and the data of the CCB 1 are updated accordingly. Furthermore, both ports may be used in parallel for a pre-defined amount of time, preferably until the last application has received the new certificates. This aspect has the advantage that the servers may continue running and a connection via the new port is only necessary after a restart of the broker or server. The same applies to a reconnect of the server to the broker.

The following is an example of a transfer of configuration files (attribute files) and/or log files. To this end, a CCB client agent may establish a connection to the target broker and request the corresponding file(s):

```
program 'UPATT':'uploadAttributeFile' is
    define data parameter
        1 CbGeneral      ('CB_GENERAL')           In Out
        1 BrokerName     (A32)                    In
        1 Content        ('TEXT_FILE_BUFFER'/V)   In
        1 Function_Result (I4)                    Out
    end-define
```

As can be seen, the length of the text buffer is variable. The CCB 1 copies the content of the attribute file to the field 'CONTENT' and then executes the program uploadAttributeFile( ).

```
/*
 * Saves the attribute file of broker 'BrokerName' into
 * 'Content'.
 */
program 'DOWNATT':'downloadAttributeFile' is
    define data parameter
        1 CbGeneral      ('CB_GENERAL')           In Out
        1 BrokerName     (A32)                    In
        1 Content        ('TEXT_FILE_BUFFER'/V)   Out
        1 Function_Result (I4)                    Out
    end-define
```

Similarly, the above program downloadAttributeFile may be used for downloading an attribute file. To this end, the CCB client agent, after having called the program, writes the data received in 'CONTENT' into the respective file.

```
/*
 * Saves the log file of broker 'BrokerName' into
 * a file with full path 'FileName'. Possible command
 * codes:
 *     START - starts the download
 *     STATUS - checks the progress via variable
 *         'ReceivedSize'
 *     CANCEL - cancels the download
 */
program 'DOWNLOG':'downloadLogFile' is
    define data parameter
        1 CbGeneral      ('CB_GENERAL')    In Out
        1 BrokerName     (A32)             In
        1 CommandCode    (A32)             In
        1 FileName       (A256)            In
        1 ReceivedSize   (I4/2)            Out
        1 TotalSize      (I4/2)            Out
        1 Function_Result (I4)             Out
    end-define
```

Since a log file may become rather large, the program downloadLogFile may be called multiple times in order to receive a complete log file. After the first call with CommandCode 'START', the size of the log file may be determined (via 'TotalSize'). Furthermore, the status of the download may be determined. ReceivedSize and TotalSize may change in this context, e.g. TotalSize may change when further data is written into the log file. If ReceivedSize is identical to TotalSize, the download has finished. The CommandCode 'Cancel' cancels the download.

Program Distribution

This aspect of the invention comprises an automatic distribution of applications by the CCB 1. In one aspect, the above-described file transfer capability may be used for this task. The CCB 1 may to this end maintain an image (i.e. a screenshot of the program data) before and after the program distribution in order to be able to restore the last correct state in case of failure.

The programs are preferably distributed onto the target computers in the background and are activated by the CCB 1. During an update of a program with a new program, the updates are preferably stored in the after image. When all programs are stopped prior to the update, the files to be replaces are moved into the before image. If this is not possible, the update is preferably cancelled and all changes are reversed. Otherwise, the data of the after image is moved into the corresponding target directories. Lastly, the program is restarted. In case of a fallback, the process may be executed in the reverse order.

Instanciator Service

In case the underlying operating system (on the computer of a client 10, server 30, broker 20 and/or the CCB 1) does not provide functionality for starting and/or stopping new processes, the present invention provides in one aspect an instanciator service adapted for starting, stopping and/or requesting the status of a process. Furthermore, the instanciator service may be adapted for auto-starting processes after the booting procedure of the operating system.

The following is an example of an instanciator service for Windows XP. To this end, the instanciator service may be implemented as windows service. The windows registry comprises process information for the processes. In order to start a process, the instanciator service may read the necessary information from the windows registry, such as the command line, the environment and/or the working directory (see further above). Based on this information, the instanciator service may then start the respective process(es). Furthermore, a process may be stopped e.g. using an operating system semaphore. Also a killing of a process, i.e. a forced stopping even in case the process does not react, is possible. The CCB 1 may provide the instanciator service with the necessary information. It should be appreciated that similar instanciator services may be provided for any kind of operating system.

Additionally or alternatively, processes may be started using the openssh client/server agent solution provided by the present invention (see further above). To this end, the openssh CCB client agent may trigger the openssh CCB server agent to establish a connection and to start the respective process via the openssh daemon. After the start of the respective process, a direct communication between the process and the CCB 1 is possible, so that the CCB 1 may then start, stop, or request the status of the process as needed.

Plug-Ins

The functionality of the CCB 1 of the present invention is preferably extendible via plug-ins. One exemplary plug-in allows custom applications to determine information about the processing load of a server 30 and to send this information to the CCB 1. According to its rule set, the CCB 1 may then start a predefined number of servers 30 or may dynamically adjust the time for starting custom Application.

The plug-ins may in another aspect provide an interface for receiving events by the CCB 1. This plug-in may be used for providing the stubs (see above) with current data. A stub may thereby also receive filtered status information about its assigned brokers 20, servers 30 and/or clients 10.

Application Programming Interface (API)

The CCB 1 may in one aspect provide an application programming interface (API). The API may be adapted for configuring and controlling the CCB 1 and may be accessed via the RPC protocol and/or ACI protocol. An application accessing the API of the CCB 1 may run on a computer different from the CCB 1.

The API of the CCB 1 may be divided into a number of groups of commands offered as individual interfaces of the CCB 1, which may be defined in one or more IDL (interface definition language) files. In the following, an exemplary API of one embodiment of the CCB 1 is explained in more detail.

FIG. 9 shows a data structure CB_GENERAL that is preferably comprised in each IDL, i.e. in each interface provided by the CCB 1. The CB_GENERAL data structure in FIG. 9 comprises general information and data for the CCB 1 and/or applications wanting to access the CCB 1, e.g. a session identifier (field 'SessionID' in FIG. 9), user credentials ('UserId' and 'UserPassword'), error information ('ErrorClass', 'ErrorCode' and 'ErrorMessage'), options ('Option') and further fields, which are passed when executing a certain program (see below).

FIG. 10 shows an example of an IDL defining an authorization rules interface of the CCB 1. In the following, the programs that can be called by the CCB 1 are explained in more detail with respect to FIG. 10. FIG. 10 shows, besides the command code, the input parameters (AR_REQUEST in FIG. 10) of the corresponding command, as well as the output parameters (AR_RESPONSE).

AR_GET_RULELIST returns a list of all known authorization rules 150. The command AR_GET_RULELIST may be called with an optional parameter 'Category' in order to only retrieve the rules of a certain category.

AR_GET_RULE returns the data of a certain authorization rule 150. The parameter 'RuleName' comprises the name of the rule. The response value 'fTropic' may comprise the category of the respective rule.

AR_GET_USERS returns a list of users that are allowed to use the broker service determined by 'RuleName'.

AR_CREATE_RULE creates a list for rules. Parameters are 'RuleName' and the category 'List'. Accordingly, AR_DELETE_RULE deletes a rule from a selected category.

AR_ADD_BROKERSERVICE adds a rule of the category 'BROKER-SERVICE' to the rule list created by AR_CREATE_RULE, as well as the users that are allowed to use the respective service. A rule may have more than one entry.

AR_ADD_BROKERTOPIC adds a rule of the category 'BROKER-TOPIC' to the rule list created by AR_CREATE_RULE, as well as the users that are allowed to use the respective topic. A rule may have more than one entry of different categories.

AR_DELETE_SORT deletes a selected entry from a rule list.

AR_MODIFY_USERS modifies the users of a rule and their access rights. Similarly, the authorization interface of FIG. 10 may comprise commands AR_MODIFY_TIMECONTROL, AR_MODIFY_LOCATION and/or AR_MODIFY_OWNER, as well as further suitable commands.

FIG. 11 shows an example of an IDL defining a location transparency interface of the CCB 1. The location transparency interface may serve for defining logical brokers and services, e.g. for defining a plurality of "virtual" brokers residing on a real broker 20, wherein the "virtual brokers" may be accessed by clients 10, servers 30 and/or the CCB 1 like any other broker 20.

FIG. 12 shows an example of an IDL defining an admin interface of the CCB 1. The admin interface comprises data structures and program definitions that can be used by CCB client agents and/or any other participant within the network wanting to access the CCB 1, such as clients 10, servers 30 and/or brokers 20.

In the example of FIG. 12, a broker 20 is defined as a service of the type BROKER. A remote broker (i.e. a broker running outside of the broker system of the CCB 1), is defined as a service of the type BROKER-INSTANCE. Further types are possible, such as BROKER-SERVICE and RPC-SERVER.

In order to create a service via the API of the CCB 1 (more precisely via the admin interface of the CCB 1), the command createService( ) may be called. In order to create a broker, the command createBroker( ) may be called (cf. FIG. 12).

The admin interface IDL may comprise a structure 'INFO BROKER COMMANDS' that can be used to determine which broker commands are allowed to be executed (e.g. via CIS). The table shown in FIG. 12 depicts the corresponding options, their values and a description. The abbreviation 'v' stands for 'visible' and 'vi' stands for 'invisible'. If the value for the respective service is set to '1', data can be requested from the broker service via CIS and/or RPC CIS. To this end, the program 'getBrokerAdditionalInfo' may be executed in order to receive the connection data from the CCB 1. 'INFO_ADD_BROKER' comprises this information after the program call. Depending on 'nRpcAvailable', only the control blocks for RPC or ACI have to be filled and the CIS call may be executed.

The program 'AD_COMMAND' executes commands. The following table lists commands that can be started without an individual program call. With the argument 'option', optional functionality can be selected. The CommandCode 'ST_BROKER' can be used to start or stop a broker, depending on the value of 'option'. The name of the broker may be passed in the structure 'INFO_GEN_SERVICE':

| command code | option == 1 | option == 0 |
|---|---|---|
| ST_BROKER | Start Broker | Stop Broker |
| RESTART_BROKER | Restart Broker | |
| DELETE_BROKER | Delete Broker | Remove Remote Broker Definition |
| MIGRATE_BROKER | Migrate Broker | |
| ST_SERVICE | Start Service (process) | Stop Service |
| RESTART_SERVICE | Restart Service | |
| DELETE_SERVICE | Delete Service | |
| MIGRATE_SERVICE | Migrate Service from an old version | |
| CREDENTIALS | see 1) for valid options | |
| AUTOSTART | Enable Autostart | Disable Autostart |
| SSL_PARAMETERS | Set SSL Paramete | Get SSL Parameter |
| CLEANUP_CCB | Cleans up the CCB configuration data, remove unused entries | |

1) options for command code CREDENTIALS
option == 0: clear credentials
option == 1: save credentials
option == 2: check credentials
option == 3: check credentials and save valid credentials The further programs are explained in FIG. 12 and mainly depict the broker side. It should however be appreciated that similar programs and structures may be provided for further services (processes).

FIG. 13 shows an example of an IDL defining a management interface of the CCB 1. The management interface may comprise data structures and program definitions for modifying data of the CCB 1.

Furthermore, the management interface may comprise commands for moving a broker (i.e. a service of the type BROKER), i.e. for moving a broker 20 from one physical computer to another. The management interface may further comprise commands for moving services other than brokers 20, such as clients 10 and/or servers 30.

The following programs may be used for persistently modifying data of the CCB 1. The access to the following programs is preferably controlled by the CCB 1, so that no unauthorized access is possible.

CM_GET_KEYS returns an array with all keys beginning at the root entry. CM_GET_VALUES returns an array of values for the selected key. CM_SET_VALUES overwrites all values of a key with the array of values. CM_DELETE_KEY deletes a key and all corresponding values. CM_GET_VALUE returns a value for ValueName under the selected key. CM_SET_VALUE overwrites a value or creates it. CM_DELETE_VALUE deletes a value. The values returned by the CCB 1 preferably do not comprise placeholders, since the CCB 1 preferably replaces such placeholders.

CM_ADD_SERVICE shows an example of the creation of services (processes). The structure 'CM_SVC_VALUES' comprises to this end the necessary arguments:

```
define data parameter
  1 SVC_TYPE                  (A32)
    // BROKER, BROKER-INSTANCE, RPC-SERVER, ...
  1 SVC_SERVICE_NAME          (A32)
    // ETB001
  1 SVC_LOADABLE              (I1)
    // 0=NO executable, 1=YES shared library
  1 SVC_STARTABLE             (I1)
    // 1=YES executable, 1=NO shared library
  1 SVC_START_PROGRAM         (A256)
    // path and file name
  1 SVC_START_ARGUMENTS       (A4096)
    // command line with place holders
  1 SVC_STOP_PROGRAM          (A256)
    // path and file name for a 'stop' program
  1 SVC_STOP_ARGUMENTS        (A4096)
    // command line with place holders
  1 SVC_SHUTDOWN_TYPE         (I1)
    // 0 = shutdown by signal, 1 = by stop program
  1 SVC_WAITTIME_KILL         (I2)
    // wait time between shutdown and kill process
  1 SVC_ENVIRONMENT           (A4096)
    // environment with place holders
  1 SVC_WORKDIR               (A256)
    // working directory
  1 SVC_CONFDIR               (A256)
    // config directory
  1 SVC_CONFIGFILE            (A256)
    // path and file name config file
  1 SVC_LOGDIR                (A256)
    // log directory
  1 SVC_LOGFILE               (A256)
    // log file and path name
  1 SVC_TEMPDIR               (A256)
    // temp directory
  1 SVC_AUTOSTART             (A256)
    // automatic autostart boot option
  1 SVC_SSL_PRIV_KEY          (A256)
    // SSL files
  1 SVC_SSL_PRIV_CERT         (A256)
  1 SVC_SSL_PUBL_CERT         (A256)
  1 SVC_HOSTNAME              (A32)
    // hostname
end-define
```

The program 'CM_MOVE_BROKER' may be used to move a broker 20 locally and/or to another computer. The CCB 1 may create a directory (e.g. via file transfer, see further above) and may create and/or copy all relevant files. Subsequently, the broker 20 may be started (e.g. via the instanciator service). If the new broker is running, the configuration files of the broker saved by the CCB 1 and the respective broker server is started. Optionally, an event may be sent via the CCB plugin to the server that triggers the server to connect to the new broker. In case a client wants to connect to the broker before the servers are started, the broker stub may insert one or more waiting cycles until the servers are started. A rule "delete after shutdown" may be created for the old broker. Consequently, new connections from clients and/or servers are preferably only established with the new broker.

The old broker may receive a command to shutdown with an option to wait until the last client connection has been closed. Once the broker is stopped, all resources under control of the CCB 1 may be deleted and subsequently, all data of the broker may be deleted in the CCB 1.

Usage Scenarios

In the following, exemplary usage scenarios are explained in more detail with flow charts depicting processing steps performed by the CCB 1, the backup CCB 1', the clients 10, the servers 30 and/or the brokers 20.

FIG. 5 shows an exemplary flow chart of processing steps performed during startup of the CCB 1 and the optional backup CCB 1'. Messages sent by the CCB 1 are shown on the left-hand side of FIG. 5 and messages sent by the backup CCB 1' are shown on the right-hand side. As can be seen, the flow chart of FIG. 5 starts at the top with the start-up of the backup CCB 1' while the CCB 1 is stopped. During start-up, the backup CCB 1' first sends a listen message 500, followed by a connect message 505. Since at this point in time in the example of FIG. 5, the CCB 1 is still stopped, the backup CCB 1' receives a timeout message 510 after a selectable timeout of e.g. 15 seconds. When the CCB 1 performs its start-up, it first sends a listen message 515, followed by a connect message 520. The backup CCB 1' responds to the connect message 520 with an acknowledge message 525 (acknowledge messages are also called 'ACK' in the following and generally serve for confirming previous messages). Subsequently, the CCB 1 sends a broadcast message 530, which is also confirmed by the backup CCB 1' by a corresponding ACK message 535. The backup CCB 1' then sends a second connect message 540. Note that the first connect message 505 of the backup CCB 1' resulted in a timeout response 510, since the CCB 1 was not running at that time. This time, however, the second connect message 540 is confirmed by the CCB 1 by an ACK message 545. The backup CCB 1' then sends a broadcast message 550, which is confirmed by the CCB 1 by an ACK message 555. As a result, the connection between the CCB 1 and the backup CCB 1' is established. When the backup CCB 1' is stopped, it sends a delete broker message 560. When the delete broker message 560 is confirmed by the CCB 1 via the ACK message 565, the backup CCB 1' may finally disconnect from the CCB 1 via a disconnect message 570.

FIG. 6 shows an exemplary flow chart of processing steps performed when a client 10 connects to a broker 20 via the CCB 1. Messages sent by the CCB 1 are shown on the left-hand side of FIG. 6 and messages sent by the broker 20 are shown on the right-hand side. The scenario starts with the client 10 issuing a connection request for a broker 20. To this end, the client 10 calls its client stub 15 with a broker name, a BrokerURL and/or a service name, e.g. in the format broker://<broker name> or css://<class/server/service>. As can be seen in FIG. 6, the broker 20 first sends a connect message 600, which, however, results in a timeout message 605 (after a selectable timeout of e.g. 15 seconds), since the CCB 1 is stopped at this point in time. After the CCB 1 is started, it sends a listen message 610 in order to detect incoming messages. As a result, the second connect message 615 sent by the broker 20 is confirmed by an ACK message 620. The broker 20 then sends a broadcast message 625, which is confirmed by the CCB 1 with an ACK message 630. The broker 20 then sends a request message 635 in order to invoke the command getBrokerList(BrokerName) on the CCB 1. As already described further above, the CCB 1 validates whether the client 10 is authorized to establish a connection with the desired broker 20, preferably by means of the authorization rules 150 of the CCB 1. In the following, it is assumed that the client 10 is authorized to access the desired broker 20. FIG. 6 shows two possible responses to the request message 635. In case the request message 635 is received by the CCB 1 within a predefined time window, the CCB 1 response with an ACK message comprising a list of available brokers 20 and/or services. The list may be specifically tailored to the requesting client 10, i.e. it may only comprise the brokers 20 and/or service relevant to the client 10 and may further comprise backup systems which are currently not available. Furthermore, the ACK message 640 comprises one or more authorization rules 150 that define how the client 10 may select the desired broker 20 (from the received list). However, in case the request message 635' is received by the CCB 1 outside of the predefined time window, the CCB 1 responds with a NAK message 645 (NAK=negative acknowledgement message), so that the requesting client 10 is not allowed to establish a connection to any broker 20 except the CCB 1. As already described above, the client 10 (preferably the client stub 15) may store the received list of brokers 20 and/or the received authorization rules 150 locally in order to be able to access the respective brokers 20 in case the CCB 1 is unavailable in the future. Lastly, then the broker 20 is stopped, it sends a delete broker message 650, which is confirmed by an ACK message 655 of the CCB 1, so that the broker 20 can finally send a disconnect message 660 (similar to the sequence described in FIG. 5 above).

FIG. 7 shows an exemplary flow chart of processing steps performed when a client 10 connects to a broker 20 while the CCB 1 is unavailable and/or restarted. Messages sent by the CCB 1 are shown on the left-hand side of FIG. 7, messages sent by the client 10 are shown in the center and messages sent by the broker 20 are shown on the right-hand side. The scenario starts after the client 10 has already received the list of available brokers 20 and/or authorization rules 150 (cf. FIG. 6 and the corresponding description above). Firstly, the client 10 tries to connect with the CCB 1 by sending a connect message 700. Since, however, the CCB 1 is stopped or unavailable for any other reason in this scenario, the client 10 receives a timeout message 705, preferably after a selectable timeout of e.g. 15 seconds. Since the client 10 has already received the list of available brokers 20 and/or authorization rules 150, the client 10 uses this data to establish a connection to a broker 20. To this end, the client 10 (preferably via the client stub 15) sends a connect message 710 to a broker 20 (the broker 20 is preferably selected from the list of available brokers 20 the client 10 had already received; cf. FIG. 6). The broker 20 responds with an ACK message 715. Subsequently, the client 10 sends a broadcast message 720, which is also confirmed by the broker 20 via an ACK message 725. The broker 20 holds a copy of the necessary client data for its broker list. The client 10 sends a request message 730 in order to invoke the command getBrokerList(BrokerName) on the broker 20. The broker 20 responds with an ACK message 735 comprising its copy of the client data, i.e. the list of available broker 20 and/or authorization rules 150. In case the selected broker 20 is not available, the client 10 may search within its local data (the stored list of available brokers) and/or rules. If the client 10 finds a backup broker for the non-available broker 20, the client 10 may (via the client stub 15) connect to this backup broker according to the stored rules. As soon as the CCB 1 is available again (and therefore sending a listen message 740 in order to detect incoming messages), the client 10 may request a refreshed list of available brokers and/or authorization rules 150 from the CCB 1. To this end, the client 10 sends a connect message 745, which is confirmed by the CCB 1 via an ACK message 750. After a broadcast message 755 from the client 10 and an ACK message 760 from the CCB 1, the client 10 sends a request message 765 to the CCB 1 and receives in response an ACK message 770 from the CCB 1 comprising the refreshed broker list and/or authorization rules 150.

FIG. 8 shows an exemplary flow chart of processing steps performed when a client 10 wants to connect to a broker 20 that is unavailable. Messages sent by the CCB 1 are shown on the left-hand side of FIG. 8, messages sent by the client 10 are shown in the center and messages sent by the broker 20 are shown on the right-hand side. Firstly, the client 10 retrieves the list of available brokers and/or authorization rules 150 from the CCB 1, similar as already described further above. To this end, the client sends a connect message 800, which is confirmed by the CCB 1 via an ACK message 805. The client 10 then sends a broadcast message 810, which is also confirmed by the CCB 1 via an ACK message 815. In response to a request message 820 from the client 10, the CCB 1 sends an ACK message 825 to the client 10 comprising the list of available brokers 20 and/or authorization rules 150. The client 10 may then try to establish a connection to the broker 20. To this end, the client sends a connect message 830 to the broker 20. However, in case the broker 20 does not accept a connection request by the client 10 (e.g. because the workload of the broker 20 is too high), the broker 20 sends a NAK message 835 to the client 10. Alternatively, if the broker 20 is stopped, the client 10 receives a timeout message after a selectable timeout interval of e.g. 15 seconds. The client 10 may then inspect its list of available brokers and may select 840 another broker to contact. Preferably, the next broker within the list is selected by the client 20, which is in the example of FIG. 8 the broker 21. The client 10 then sends a connect message 845 to the selected broker 21, which is in this example confirmed by the broker 21 via an ACK message 850. The client 10 may now send one or more request messages 855 to the broker 21 any may receive one or more corresponding answer messages 860 from the broker 21. Finally, FIG. 8 shows how the client 10 disconnects from the broker 21 with the disconnect message 865.

In summary, the CCB 1 of the present invention is adapted for monitoring and steering all participants, i.e. the clients 10, servers 30 and brokers 20 as well as their processes needed within a heterogeneous network to function properly.

Brokers 20 may be monitored, configured and controlled in a rule-based manner. Each broker 20 may provide data about its load to the CCB 1. Also the servers 30 may be monitored, configured and controlled in a rule-based manner. Servers 30 may send load information to the CCB 1 e.g. by using a plug-in. The same applies to the clients 10. Moreover, the CCB 1 may be adapted for starting, stopping and retrieving status information of processes within the clients 10, servers 30 and brokers 20 by using operating system functionalities. Pausing, shutting down and/or a shutdown after a logoff of the last user may be provided by the CCB 1 via the plug-in.

In the following, an exemplary implementation of the present invention is de scribed. In contrast to the prior art, the present invention provides in one aspect architecture with only five broker agents. The five broker agents establish a connection to a configuring & configuration (C&C) service that runs on a dedicated configuring & controlling broker (CCB), such as the CCB 1 shown in FIG. 4. The CCB preferably provides only the C&C service, which increases the security of the CCB, since the CCB does not provide any other services which could provide a point of attack for hackers. The CCB is preferably not available to customer applications, i.e. to applications other than special administration applications.

In the above-described scenario, in contrast to the prior art, the broker agents only serve for displaying information to users (i.e. the broker agents are only responsible for the presentation layer), while the processing logic itself is moved into the CCB. In one aspect, the C&C service creates a list of available commands and services for each broker managed by the CCB. A service in this context is a piece of functionality, possibly implemented within a computer program, that is offered to clients, provided by servers and mediated by brokers. The broker agents themselves do not have any functionality for determining, whether certain functionality is available within the brokers. Instead, the respective processing logic is only provided by the C&C service.

In one aspect, the following five broker agents may be supported. It should be appreciated that the various functionalities provided by the agents are only exemplary and may be implemented independently from each other:

A 'Root Agent' is adapted for contacting the CCB (i.e. its C&C service) in order to retrieve a list of all known brokers. The list may be divided among local brokers (i.e. brokers residing within the same network/broker system than the CCB), remote brokers (i.e. brokers residing in another network/broker system than the CCB) and the CCB itself. Preferably, the CCB is not included in the list sent to the Root Agent.

An 'Admin Agent' administers the known local and/or remote brokers, which may comprise starting, stopping, re-starting the brokers (i.e. the respective processes on the broker computers) as well as the setting of SSL parameters and user credentials, if necessary. To this end, the CCB (i.e. the C&C service) provides information, whether the SSL parameters are needed (indicated by a corresponding command flag). Regarding the user credentials, the CCB provides information, whether the user credentials are needed and whether they are valid or invalid. From the point of view of the Admin Agent, this aspect is reflected in the commands 'Clear Credentials' and 'Set Credentials', respectively. In case no user credentials are needed for the respective broker, none of the two commands appears. For all commands available in CIS (Command and Information Services), the evaluation is performed by the CCB, which also provides a list of all allowed commands for each managed broker. The CCB may be further adapted for providing a list of all available Information Services of a selected broker.

A 'Service Agent' is adapted for receiving from the CCB all relevant information in order to establish a connection to a broker. To this end, an existing RPC (Remote Procedure Call) interface or an existing ACI CIS interface may be used. This interface may also be available to custom applications. The Service Agent may be adapted for taking into account the CIS version of the broker that it has received from the CCB, in order to display the data received from the broker in a suitable manner (e.g. according to the correct CIS version).

A 'LocTrans Agent' (location transparency agent) may be used. In this aspect, the agents do not edit the data themselves, but may use an RPC interface provided by the CCB.

An 'AuthRule Agent' (authorization rules agent) may be used. In this aspect, the agents do not edit the data themselves, but may use an RPC interface provided by the CCB.

The invention claimed is:

1. A broker system for a plurality of broker computer systems, a plurality of client computer systems, and a plurality of server computer systems in a heterogeneous computer network, at least one of the plurality of broker computer systems being configured to receive a request sent from at least one of the client computer systems, pass the request to at least one of the plurality of server computer systems, and return a response sent from the server computer system back to the at least one of the client computer systems, the request from the at least one of the client computer systems not specifying a particular one of the plurality of server computer systems for which the request will be served, the broker system comprising:

a configuration and controlling broker (CCB) configured to scan broker configuration data of the plurality of broker computer systems and to synchronize the broker configuration data with CCB configuration data of the CCB, wherein the CCB is further configured to:
store authorization rules that are used to restrict communication between the plurality of broker computer systems, client computer systems, and/or server computer systems in the heterogeneous network;
receive an authorization request from a requesting client computer system of the plurality of client computer systems, the authorization request including a request to connect to the at least one of the broker computer systems of the plurality of broker computer systems;

determine whether or not the authorization request is to be granted or denied based on the stored authorization rules; and send an authorization response to the requesting client computer system and/or at least one of said broker computer systems based on the determination, the requesting client computer system being the at least one of the client computer systems, wherein the authorization request from the requesting client computer system to the CCB is sent before the requesting client computer system establishes a connection to the at least one of the broker computer systems.

2. The broker system of claim 1, wherein the CCB is configured to send a subset of the CCB configuration data to at least one of the plurality of broker computer systems for configuring the respective broker computer system without affecting its availability.

3. The broker system of claim 2, wherein the CCB is configured to send a subset of the authorization rules to at least one of the plurality of broker computer systems, the subset of the authorization rules defining allowed connections to be established by the respective broker computer system.

4. The broker system of claim 1, wherein at least one of the plurality of broker computer systems is configured to register with the CCB and wherein the CCB is configured to maintain a list of all registered brokers.

5. The broker system of claim 1, wherein at least one of the plurality of client computer systems and/or server computer systems comprises a client stub and/or a server stub, respectively, wherein the client stub and/or the server stub is configured to request authorization by the CCB before establishing a connection to one of the brokers.

6. The broker system of claim 5, wherein the client stub and/or the server stub is configured to receive a subset of the CCB configuration data and/or a subset of the authorization rules from the CCB and to store the subset of the CCB configuration data and/or the subset of the authorization rules locally on the respective client computer system and/or server computer system.

7. The broker system of claim 6, wherein the client stub and/or the server stub is configured to establish a connection to at least one of the plurality of broker computer systems according to the stored configuration data and/or the stored authorization rules, if the CCB is unavailable.

8. The broker system of claim 1, wherein the processing of the CCB is performed by a service running locally on the CCB.

9. The broker system of claim 1, further comprising at least one backup CCB configured to receive a copy of the CCB configuration data from the CCB.

10. The broker system of claim 1, wherein at least one of the plurality of broker computer systems and/or server computer systems is configured to send workload information to the CCB and wherein the CCB is configured to start one or more further brokers and/or servers depending on the workload of the respective broker and/or server.

11. The broker system of claim 10, wherein the CCB is configured to generate statistics about the workload of at least one of the plurality of broker computer systems and/or server computer systems, the statistics indicating reoccurring workload peaks, wherein the CCB is further configured to start one or more additional brokers and/or servers before the next expected workload peak.

12. A configuration and controlling broker (CCB) for use in a broker system of claim 1.

13. A method for configuring and controlling a plurality of broker, client, and server computer systems in a heterogeneous network using a broker system of claim 1.

14. A non-transitory computer storage medium storing a program comprising instructions for implementing a method according to claim 13.

15. A broker system for a plurality of broker computer systems, a plurality of client computer systems, and a plurality of server computer systems in a heterogeneous computer network, at least one of the plurality of broker computer systems being configured to receive a request sent from at least one of the client computer systems, pass the request to at least one of the plurality of server computer systems, and return a response sent from the server computer system back to the at least one of the client computer systems, the request from the at least one of the client computer systems not specifying a particular one of the plurality of server computer systems for which the request will be served, the broker system comprising:

a configuration and controlling broker (CCB) configured to scan broker configuration data of the plurality of broker computer systems and to synchronize the broker configuration data with CCB configuration data of the CCB, wherein the CCB is further configured to:

store authorization rules that are used to restrict communication between the plurality of broker computer systems, client computer systems, and/or server computer systems in the heterogeneous network;

receive an authorization request from a requesting client computer system of the plurality of client computer systems, the authorization request including a request to connect to at least one of the broker computer systems of the plurality of broker computer systems;

determine whether or not the authorization request is to be granted or denied based on the stored authorization rules; and send an authorization response to the requesting client computer system and/or at least one of said broker computer systems based on the determination, the requesting client computer system being the at least one of the client computer systems, wherein the authorization request from the requesting client computer system to the CCB is sent before the requesting client computer system establishes a connection to the at least one of the broker computer systems, wherein the plurality of broker computer systems includes a first broker, the plurality of client computer systems includes a first client, and the plurality of server computer systems includes a first server, wherein the first broker is configured to:

receive a first request from the first client in a first communication protocol; and send a subsequent request to the first server in a second communication protocol that is different from the first communication protocol, the subsequent request being based on the first request.

16. The broker system of claim 15, wherein the first client does not have knowledge of the first server for performing the request.

17. A broker system comprising:

a computer network;

a plurality of client computer systems coupled to the computer network;

a plurality of server computer systems coupled to the computer network;

a plurality of broker computer systems coupled to the computer network, where at least one of the plurality of broker computer systems is configured to receive a request sent from at least one of the client computer systems, pass the request to at least one of the plurality of server computer systems, and return a response sent from the server computer system back to the at least one of the client computer systems, the request from the at least one of the client computer systems not specifying a particular one of the plurality of server computer systems for which the request will be served; and a configuration and controlling broker (CCB) configured to scan broker configuration data of the plurality of broker computer systems and to synchronize the broker configuration data with CCB configuration data of the CCB, the CCB is further configured to:

store authorization rules that are used to restrict communication between the plurality of broker computer systems, client computer systems, and/or server computer systems in the heterogeneous network;

receive an authorization request from a requesting client computer system of the plurality of client computer systems, the authorization request including a request to connect to the at least one of the broker computer systems; and send an authorization response to the requesting client computer system and/or at least one of said broker computer systems that includes data which indicates whether or not the requesting client computer system is authorized to communicate with the at least one of the broker computer systems, the requesting client computer system being the at least one of the client computer systems, wherein the requesting client computer system is not authorized to send the request to the at least one of the broker computer systems until being authorized based on the data included in the sent authorization response.

* * * * *